(12) United States Patent
Mercer

(10) Patent No.: US 12,325,492 B2
(45) Date of Patent: Jun. 10, 2025

(54) AUTOMATIC TRANSMISSION SYSTEM FOR A BICYCLE

(71) Applicant: Innovative Engineering LLC, Excelsior, MN (US)

(72) Inventor: Haven Mercer, Excelsior, MN (US)

( * ) Notice: Subject to any disclaimer, the term of this patent is extended or adjusted under 35 U.S.C. 154(b) by 0 days.

(21) Appl. No.: 18/121,678

(22) Filed: Mar. 15, 2023

(65) Prior Publication Data

US 2023/0373592 A1    Nov. 23, 2023

Related U.S. Application Data

(60) Provisional application No. 63/343,149, filed on May 18, 2022.

(51) Int. Cl.
*B62M 9/08* (2006.01)
*F16H 9/24* (2006.01)

(52) U.S. Cl.
CPC .............. *B62M 9/08* (2013.01); *F16H 9/24* (2013.01)

(58) Field of Classification Search
CPC ......... B62M 9/08; B62M 9/123; B62M 9/16; F16H 55/54; F16H 9/24; F16H 9/10; F16H 3/42; F16H 3/426
USPC ............................................ 474/70, 47, 49
See application file for complete search history.

(56) References Cited

U.S. PATENT DOCUMENTS

| | | | | |
|---|---|---|---|---|
| 2,028,577 A * | 1/1936 | Vincenzoni | ............. | B62M 9/04 74/148 |
| 2,214,828 A | 9/1940 | Bowen | | |
| 2,464,635 A * | 3/1949 | Cunningham | ............ | F16H 9/24 474/135 |
| 2,584,447 A * | 2/1952 | Hayot | ...................... | B62M 9/08 474/50 |
| 3,969,948 A * | 7/1976 | Pipenhagen, Jr. | ....... | B62M 9/08 474/57 |
| 3,995,508 A * | 12/1976 | Newell | ................... | F16H 35/02 474/50 |
| 4,069,719 A * | 1/1978 | Cancilla | .................. | B62M 9/16 474/134 |
| 4,373,926 A * | 2/1983 | Fullerton | ................. | F16H 9/10 474/57 |

(Continued)

FOREIGN PATENT DOCUMENTS

| | | | | |
|---|---|---|---|---|
| CN | 103486156 | | 1/2014 | |
| DE | 102010019045 A1 * | 11/2011 | ............ | F16H 55/54 |
| WO | WO-2018178898 A1 * | 10/2018 | | |

*Primary Examiner* — Henry Y Liu
*Assistant Examiner* — Katelynne R Burrell

(57) ABSTRACT

Automatic transmission system for a bicycle configured to automatically adjust a torque ratio in response to changing drive forces by one of either diametric expansion or diametric contraction of the pattern of sprockets. The automatic transmission including a drive chain, a plurality of sprockets, and one or more mechanisms providing a spring force bias which biases the pattern of sprockets toward one of either diametric expansion or diametric contraction. The plurality of sprockets is in a substantially evenly spaced radial pattern and is configured to engage with the drive chain which encompasses a periphery of the pattern of sprockets. The pattern of sprockets is configured to expand and contract about its centroid in unison, and is restricted from rotating in a direction which enables a transfer of drive forces in propelling the bicycle forward but is able to rotate in the other direction.

20 Claims, 19 Drawing Sheets

(56) References Cited

U.S. PATENT DOCUMENTS

| | | | |
|---|---|---|---|
| 4,740,190 A * | 4/1988 | Pike | B62M 9/08 |
| | | | 474/49 |
| 5,407,395 A * | 4/1995 | Kramer | F16H 9/10 |
| | | | 474/49 |
| 5,979,924 A | 11/1999 | D'Aluisio et al. | |
| 5,980,412 A | 11/1999 | Smith | |
| 6,432,009 B1 * | 8/2002 | Hansen | F16H 9/10 |
| | | | 474/57 |
| 7,803,077 B1 | 9/2010 | Spaude | |
| 8,444,385 B2 * | 5/2013 | Yonge | B64C 11/32 |
| | | | 416/151 |
| 2004/0000206 A1 | 1/2004 | Beale | |
| 2006/0068954 A1 | 3/2006 | Kaga et al. | |
| 2016/0052595 A1 | 2/2016 | Dommsch | |
| 2016/0090151 A1 | 3/2016 | Bendel et al. | |
| 2017/0305497 A1 | 10/2017 | Lee et al. | |
| 2017/0313385 A1 | 11/2017 | Emura et al. | |
| 2018/0141614 A1 | 5/2018 | Hsu et al. | |
| 2018/0290713 A1 | 10/2018 | Tetsuka | |
| 2019/0031285 A1 | 1/2019 | Jang | |
| 2019/0283839 A1 | 9/2019 | Ljøsne et al. | |
| 2020/0072325 A1 | 3/2020 | Aitcin et al. | |
| 2020/0377174 A1 | 12/2020 | Allen et al. | |
| 2021/0031879 A1 | 2/2021 | Zubieta | |
| 2021/0371046 A1 | 12/2021 | Aguilar | |
| 2023/0365223 A1 * | 11/2023 | Singh | B62J 43/23 |

* cited by examiner

AUTOMATIC TRANSMISSION SYSTEM FOR A BICYCLE

FIELD OF THE INVENTION

This invention pertains generally to a mechanical solution for automatically adjusting the gear ratio within a bicycle's drive train.

BACKGROUND OF THE INVENTION

People around the world use bicycles as a means of transportation, enjoyment, sport, and exercise. Bicycle technology is continually evolving to meet the needs and desires of bicyclists regarding performance, quality, and comfort. One aspect of performance that some bicyclists particularly seek out is ease of operation. The force required to propel a bicycle forward is inherently variable depending on multiple factors, some of which are ground inclination, weight, and surface conditions. It is, therefore, advantageous for a bicycle to have adjustable gearing to better balance the input and output forces required in propelling a bicycle forward. Many bicyclists prefer the task of changing gears to be as easy as possible, which results in a consistent demand for new and improved solutions to meet this market desire.

SUMMARY OF THE INVENTION

Various embodiments include automatic transmissions for bicycles or other similar methods of transportation. In some embodiments, the automatic transmission system includes a drive chain, a plurality of sprockets and one or more mechanisms providing a spring force bias. The plurality of sprockets may be in a substantially evenly spaced radial pattern proximal to a common plane and substantially equidistant from the pattern's centroid, wherein the plurality of sprockets are configured to engage with the drive chain, wherein the drive chain partially encompasses a periphery of the pattern of sprockets, and wherein the pattern of sprockets is configured to expand and contract about its centroid in unison. The one or more mechanisms may provide a spring force bias which biases the pattern of sprockets toward one of either diametric expansion or diametric contraction. Each of the plurality of sprockets may be restricted from rotating in a direction which enables a transfer of drive forces in propelling the bicycle forward but is able to rotate in the other direction. The automatic transmission mechanism may be configured to automatically adjust a torque ratio in response to changing drive forces by one of either diametric expansion or diametric contraction of the pattern of sprockets.

In some embodiments, the automatic transmission assembly is a front assembly configured to transfer the drive forces between a crank assembly and the drive chain, wherein the spring force biases the pattern of sprockets toward diametric expansion and wherein the sprocket pattern is configured to diametrically compress as the drive forces are increased. In other embodiments, the automatic transmission assembly is a rear assembly configured to transfer the drive force between the bicycle's drive chain and a rear wheel hub, wherein the spring force biases the pattern of sprockets toward diametric contraction and wherein the sprocket pattern is configured to diametrically expand as the drive forces are increased. In some such embodiments, the assembly further includes one or more dampers configured to slow a decreasing of the diameter of the automatic transmission assembly when the drive force is reduced.

The automatic transmission assembly may further include a first plate, wherein the plurality of sprockets are uniformly arranged around a periphery of the first plate. Some such embodiments may further include a second plate, rotatable relative to the first plate about a common axis, wherein the first plate is configured to receive input force from a crank assembly, a rear wheel hub, or the drive chain. In some such embodiments, the first plate and second plate are biased against counter-rotation relative to each other by the one or more mechanisms providing the spring force bias. The automatic transmission assembly may further include a plurality of arms connected to the first plate by a pivotable connection, wherein each of the plurality of arms is further attached to one of the plurality of sprockets at a distal end of the arm. Each of the plurality of arms may be further connected to the second plate through a linkage configured to rotate about its connection to the arm and about its connection to the second plate. The automatic transmission assembly may further include a stop to limit the pattern of sprockets from diametric expansion beyond a largest allowed diameter, or to limit the pattern of sprockets from diametric reduction beyond a smallest allowed diameter.

In alternative embodiments, the automatic transmission assembly may include a rotor plate having a central axis, a main structure comprising at least one plate having a central axis, wherein the rotor plate and the main structure are coaxial, and one or more springs having a first end and a second end, wherein the first end is connected to the rotor plate and the second end is connected to the main structure. The automatic transmission may further include a plurality of sprockets and sprocket arms. The plurality of sprockets may be spaced around the main structure, each of the plurality of sprockets restricted from rotating in a first direction which enables transfer of drive forces in propelling the bicycle forward and unrestricted in rotation in a second direction opposite the first direction. Each sprocket arm may include a first connection to one of the plurality of sprockets at a first end, a second connection to the main structure wherein the second connection is a rotatable connection, and a mobile engagement with the rotor plate. In such embodiments, rotation of the sprocket arms at the second connection may cause counter-rotation of the rotor plate relative to the main structure to compress the one or more springs causing resistance to rotation of the sprocket arm at the second connection.

In some embodiments, the automatic transmission assembly is a front assembly of a bicycle, wherein application of drive force to the sprockets causes inward rotation of the sprocket arms at the second connection decreasing a diameter of the automatic transmission assembly at the sprockets. In other embodiments, the automatic transmission assembly is a rear assembly of a bicycle, wherein application of drive force to the sprockets causes outward rotation of the sprocket arms at the second connection increasing a diameter of the automatic transmission assembly at the sprockets. In some such embodiments, the assembly further includes one or more dampers configured to slow a decreasing of the diameter of the automatic transmission assembly when the drive force is reduced.

Other embodiments include bicycles having an automatic transmission system. The bicycle may include a front wheel, a rear wheel, a crank assembly, and an automatic transmission system. The automatic transmission system may include a drive chain, a plurality of sprockets, and one or more mechanisms providing a spring force bias. The plurality of sprockets may be in a substantially evenly spaced radial pattern proximal to a common plane and substantially equidistant from the pattern's centroid, wherein the plurality of sprockets are configured to engage with the drive chain, wherein the drive chain partially encompasses a periphery of the pattern of sprockets, and wherein the pattern of sprockets is configured to expand and contract about its centroid in unison. The one or more mechanisms providing a spring force bias may bias the pattern of sprockets toward one of either diametric expansion or diametric contraction. The plurality of sprockets may be restricted from rotating in a direction which enables a transfer of drive forces in propelling the bicycle forward but is able to rotate in the other direction. The automatic transmission mechanism may be configured to automatically adjust a torque ratio in response to changing drive forces by one of either diametrically expanding or diametrically contracting the pattern of sprockets.

In some embodiments, the automatic transmission assembly is a front assembly configured to transfer the drive force between the crank assembly and the drive chain, wherein the spring force biases the pattern of sprockets toward diametric expansion and wherein the sprocket pattern is configured to diametrically compress as the drive forces are increased. In other embodiments, the automatic transmission assembly is a rear assembly configured to transfer the drive force between the drive chain and a rear wheel hub, wherein the spring force biases the pattern of sprockets toward diametric contraction and wherein the sprocket pattern is configured to diametrically expand as the drive forces are increased. In some such embodiments, the assembly further includes one or more dampers configured to slow a decreasing of the diameter of the automatic transmission assembly when the drive force is reduced.

The bicycle may further include a first plate, wherein the plurality of sprockets are arranged uniformly around the first plate, and a second plate, rotatable relative to the first plate about a common axis, wherein the first plate is configured to receive drive force from either the crank assembly, a rear wheel hub, or the drive chain, wherein the first plate and second plate are biased against counter-rotation relative to each other by the one or more mechanisms providing the spring force bias.

BRIEF DESCRIPTION OF THE DRAWINGS

The following drawings are illustrative of particular embodiments and do not limit the scope of the inventions. The drawings are not necessarily to scale and are intended for use in conjunction with the following detailed description. Embodiments of the inventions will be described with reference to the drawings, in which like numerals may represent like elements.

DETAILED DESCRIPTION

The following detailed description is exemplary in nature and is not intended to limit the scope, applicability, or configuration of the inventions. Rather, the following description provides practical illustrations for implementing various exemplary embodiments. Utilizing the teachings provided herein, those skilled in the art may recognize that many of the examples have suitable alternatives that may be utilized. The present application claims priority to U.S.

Patent Application No. 63/343,149 filed May 18, 2022, the full disclosure of which is hereby incorporated by reference.

The invention described herein is comprised of components designed and configured to automatically adjust the torque ratio (i.e., gear ratio, mechanical advantage) within a bicycle's drive train as varying input forces are applied to the system. The system includes spring loaded mechanisms which respond to changing input forces by adjusting the radius of the path around the bicycles crank axis and rear wheel axis, which the endless chain follows, thereby adjusting the torque ratio within the system. The system's design and automatic response eliminate the need for operator input, controls, cables, derailleurs, and sprocket cassettes. The continuously adjusting nature of the system provides a smooth transition as the gear ratio changes.

Figure 1:
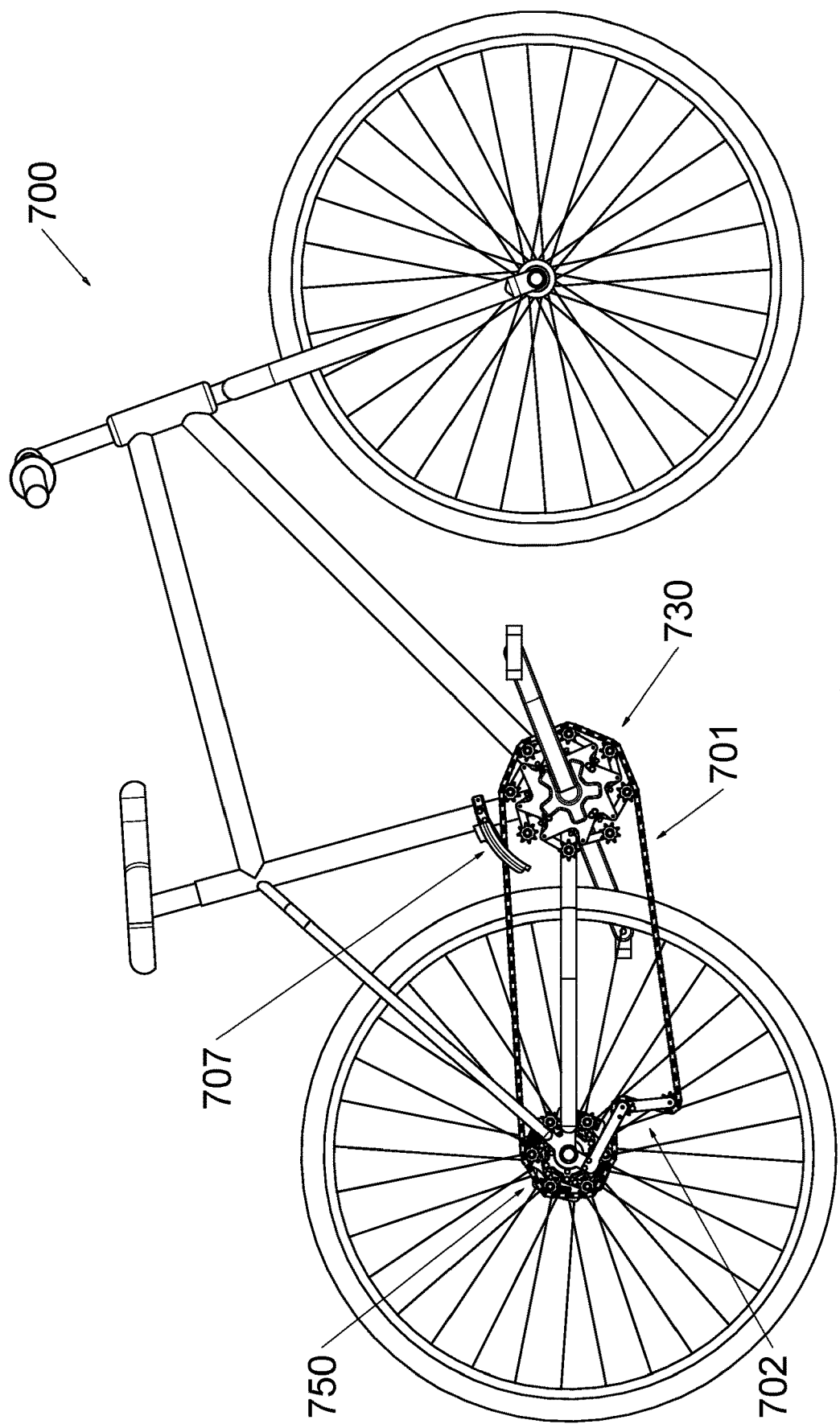
FIG. 1 is a side view of an exemplary bicycle according to various embodiments.

FIG. 1 illustrates an automatic transmission system incorporated onto an exemplary bicycle 700. The automatic transmission system includes a front assembly consisting of multiple components which comprise a front mechanism 730 and a rear assembly consisting of multiple components which comprise a rear mechanism 750. Drive forces are transferred between the front mechanism 730 and rear mechanism 750 by means of a drive chain 701, which may be a traditional roller chain, which partially encompasses the periphery of each mechanism and is kept taught by a frame mounted drive chain tensioner 702. Additionally, the system may be equipped with a chain guide 707 which the endless chain 701 passes through as it is guided into meshing with individual sprockets during operation.

In the currently disclosed embodiments, the automatic transmission system has both a front mechanism 730 and a rear mechanism 750. It should be noted, however, that these mechanisms are able to operate independently of each other and other easily envisioned embodiments of this invention could include just a front mechanism 730 or just a rear mechanism 750. In the case of a bicycle containing only a front mechanism 730, the rear end of the drive train could be configured with any existing rear drive design such as a single speed setup or a multi-speed setup comprising a sprocket cassette with multiple sprockets of varying diameters and the associated derailleur, cable, and control mechanism to shift the drive chain from one sprocket to another. In the case of a bicycle containing only a rear mechanism 750, the front end of the drive train could be configured with any existing front drive setup driven by manual (bodily) or motorized power. A manually pedal driven front drive setup could include a single sprocket or a sprocket cassette comprising multiple sprockets of varying diameters and the associated derailleur, shift cable, and control mechanism to change gears, for example. A motorized front drive setup could be configured to transfer power through a drive shaft that applies torque to rotate the front mechanism 730 about its axis; wherein the drive shaft is powered by an electric motor or a gasoline internal combustion engine, for example. The front drive setup used in conjunction with the automatic rear mechanism 750 may even be of the type which is driven by an electric motor and is also configured to sometimes receive manual power through the rider pedaling the bicycle. Alternatively, either the front mechanism 730 or rear mechanism 750 could be used alone or in combination with any other types of front or rear drive systems.

Figure 2:
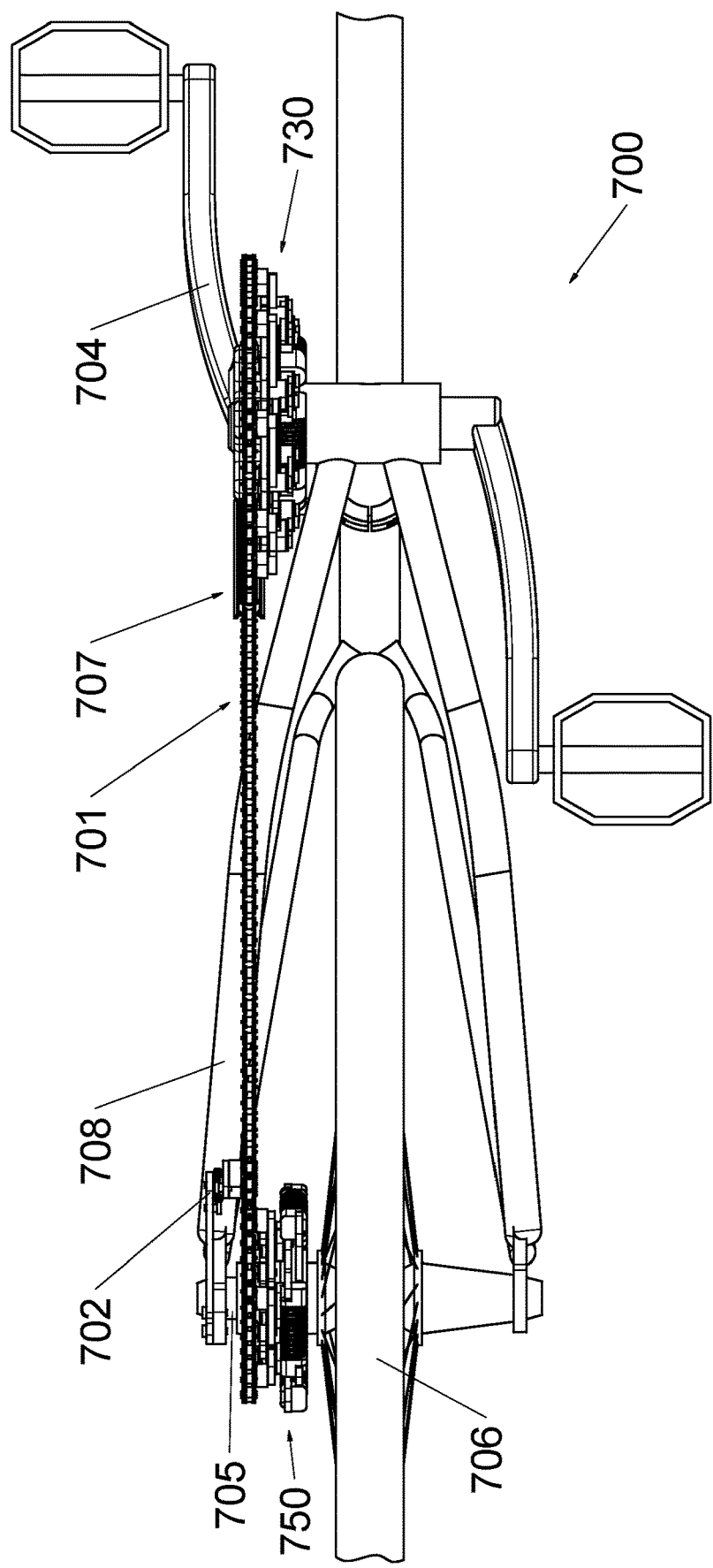
FIG. 2 is a bottom view of the exemplary bicycle of FIG. 1.

FIG. 2 is a detail bottom view of the automatic transmission in the bicycle of FIG. 1. The front mechanism 730 is attached to the bicycle crank assembly 704 with its rotational axis positioned coaxially to the crank assembly's rotational axis. The rear mechanism 750 is attached to the rear wheel hub 705 with its rotational axis positioned coaxially to the rear wheel hub's rotational axis. In some instances, the rear wheel hub 705 may be configured with a freewheel mechanism which allows the rear wheel 706 to rotate forward without requiring the rear mechanism 750 to rotate with it, but compels the rear wheel 706 to rotate simultaneously forward as the rear mechanism 750 is being rotated forward. The chain guide 707 is attached to the bicycle frame 708 and is positioned to guide the drive chain 701 onto the sprockets on the front mechanism 730, while the chain tensioner 702 fulfills the purpose of guiding the drive chain 701 onto the sprockets on the rear mechanism 750.

The automatic transmission system's compact size allows it to fit neatly into existing bicycle formats with the front mechanism 730 positioned between the bicycle frame 708 and the adjacent arm of the crank assembly 704, and the rear mechanism 750 positioned between the rear wheel 706 and frame 708. The front mechanism 730 and rear mechanism 750 are positioned such that the set of sprockets on the front mechanism 730 are substantially planar to the set of sprockets on the rear mechanism 750 and the drive chain 701 maintains a substantially planar alignment with both sets of sprockets. The automatic transmission system's compact size provides a light-weight solution especially when offset by the absence of sprocket cassettes and associated manual gear changing components. In some embodiments, the front mechanism is, for example, between about 15 mm and about 60 mm thick, or between about 20 mm and about 50 mm thick, or between about 25 mm and 40 mm thick, such as about 29 mm or about 30 mm or about 31 mm thick between its outermost component surfaces in a direction longitudinal to the front mechanism's axis of rotation. Accordingly, the envelope defined by the bicycle's peripheral components in which the front mechanism 730 rotates must contain a space that is at least greater than the extent of the front mechanism's outermost component surfaces when it's operating at its largest diameter of, for example, between about 100 mm and about 250 mm, or between about 140 mm and about 220 mm, or between about 180 mm and 210 mm, such as about 190 mm or about 195 mm or about 200 mm, according to various embodiments. Additionally, in some embodiments, the rear mechanism is, for example, between about 20 mm and about 65 mm thick, or between about 25 mm and about 55 mm thick, or between about 30 mm and 45 mm thick, such as about 34 mm or about 35 mm or about 36 mm thick between its outermost component surfaces in a direction longitudinal to the rear mechanism's axis of rotation. Accordingly, the envelope defined by the bicycle's peripheral components in which the rear mechanism 750 rotates must contain a space that is at least greater than the extent of the rear mechanism's outermost component surfaces when it's operating at its largest diameter of, for example, between about 70 mm and about 160 mm, or between about 90 mm and about 145 mm, or between about 110 mm and 130 mm, such as about 118 mm or about 120 mm or about 122 mm, according to various embodiments.

The invention described herein transfers forces along certain segments of a bicycle's drive force path. It is important to note that forces may come into the system both at the driven end as the crank is powered forward as well as from physical resistance to motion originating from sources such as gravity, inertia, and friction. Here and throughout, the terms "drive force" and "drive forces" should be interpreted as referring to any combination of forces imparted by manual or motorized power at the crank input and by resistance coming into the system at the rear wheel to ground contact point during operation of the bicycle. The front mechanism 730 transfers drive forces in either direction between the crank assembly 704 and the drive chain 701. The rear mechanism 750 transfers drive forces in either direction between the drive chain 701 and the rear wheel hub 705.

Figure 3:
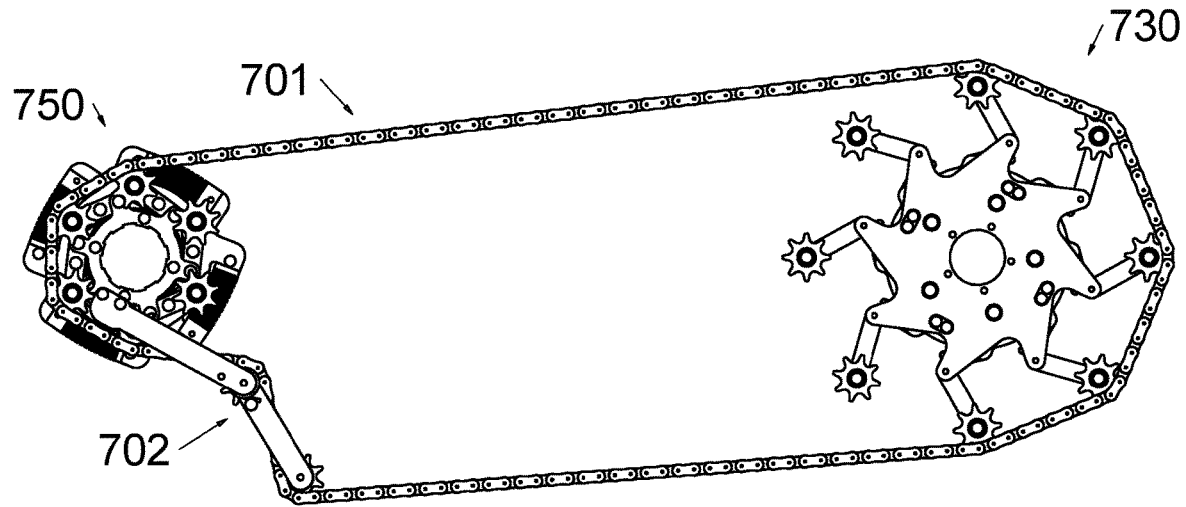
FIG. 3 is a side view of a bicycle transmission according to various embodiments.
Figure 4:
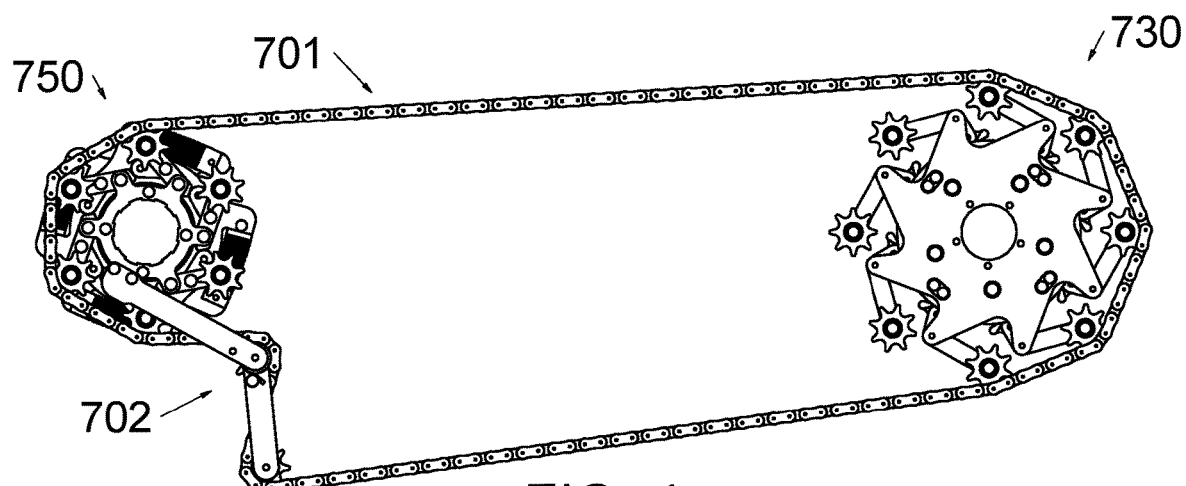
FIG. 4 is a side view of the bicycle transmission of FIG. 3 in a state of mid-range torque ratio.
Figure 5:
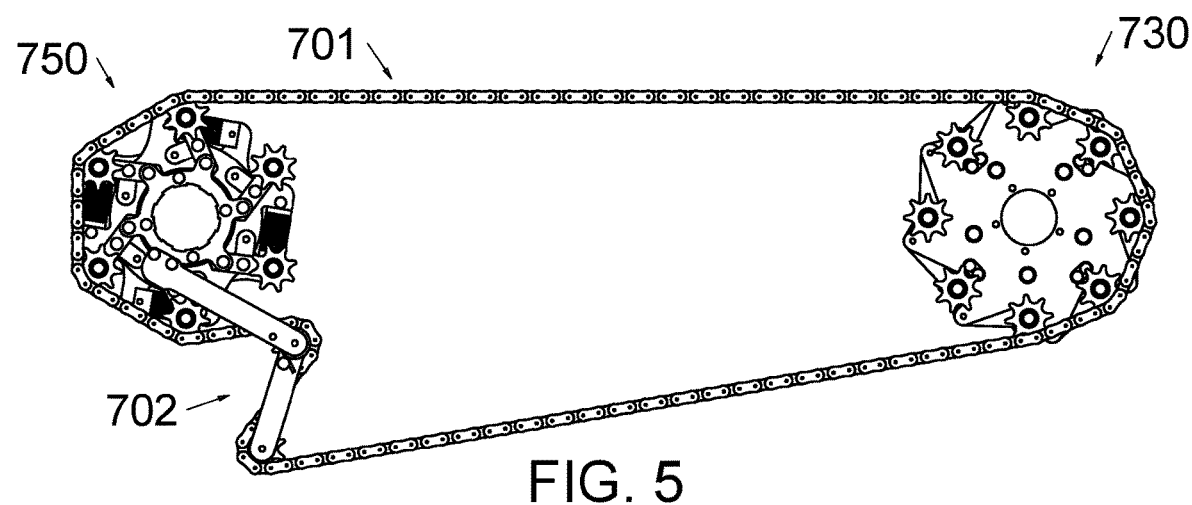
FIG. 5 is a side view of the bicycle transmission of FIG. 3 in a state of relatively low torque ratio.

FIG. 3, FIG. 4, and FIG. 5 show the automatic transmission system with the front mechanism 730 and rear mechanism 750 in several possible states of response within the given range of operation. Both the front mechanism 730 and rear mechanism 750 are configured to expand and contract diametrically within a set range defined by mechanical stops within each mechanism. The front mechanism 730 is configured with internal spring forces that bias it toward diametric expansion. When the drive forces acting upon it become sufficient to overcome its spring force bias, the front mechanism 730 is designed to compress diametrically through its allowed range until the drive forces are at equilibrium with its spring force bias or until one of its mechanical stops prevent it from compressing any further. Compression of the front assembly 730 may occur when pedaling harder, such as when starting from a standstill or when going up a hill, for example. When the drive forces acting upon the front mechanism 730 subside to be less than its spring force bias, it is designed to expand back through its allowed diametric range until the drive forces are once again at equilibrium with its spring force bias or until another mechanical stop prevents it from expanding any further.

The rear mechanism 750 is configured with internal spring forces that bias it toward diametric contraction. When the drive forces acting upon the rear mechanism 750 become sufficient to overcome its spring force bias, such as when riding up a hill, the assembly is designed to expand diametrically through its allowed range until the drive forces are at equilibrium with its spring force bias or until one of its mechanical stops prevent it from expanding any further. When the drive forces acting upon the rear mechanism 750 subside to be less than its spring force bias, the assembly is designed to contract back through its allowed diametric range until the drive forces are once again at equilibrium with its spring force bias or until another mechanical stop prevents it from contracting any further.

Due to the front mechanism's bias toward diametric expansion, and the rear mechanism's bias toward diametric contraction, the automatic transmission is consequently biased to operate at as high of a gear ratio that the balanced forces will allow. For example, when riding downhill, or on flat land, the relatively low drive forces that are required will result in the automatic transmission finding its equilibrium at a relatively high gear ratio and allowing the bicycle to be driven at higher speeds relative to the speed at which the crank is being rotated. As drive forces increase, for example, when riding up a hill or when starting from a stopped position, the front mechanism 730 will be actuated to a smaller diameter and the rear mechanism 750 will be actuated to a larger diameter until the automatic transmission finds its equilibrium at a relatively lower gear ratio, resulting in the bicycle being propelled forward at relatively lower speeds, but also requiring relatively lower cranking force to achieve movement.

The rotation of individual sprockets on each assembly is controlled by one-way locking bearings which are aligned with the central axis of each sprocket and positioned around a shoulder screw creating a rotational axis. Each bearing is locked in a direction which enables the transfer of drive forces in propelling the bicycle forward but is able to rotate in the other direction. This configuration allows the length of drive chain between adjacent sprockets to continually adjust as the diameter of the sprocket patterns change. Alternatively, the rotation of each sprocket may be controlled by other mechanical means which allow rotation in one direction but restrict rotation in the other direction such as individual ratcheting mechanisms, for example.

FIG. 3 shows the automatic transmission in a state with minimal drive forces acting upon it, such as when a bicycle is being ridden downhill and the rider is applying a very low pedal force. The spring force bias within the front mechanism 730 is holding it at or near its largest allowed diameter and the spring force bias within the rear mechanism 750 is holding it at or near its smallest allowed diameter. This state is comparable to the highest gear of a traditional bicycle transmission. FIG. 4 shows the automatic transmission of FIG. 3 in a state with sufficient drive forces acting upon it to partially compress the front mechanism 730 and partially expand the rear mechanism 750 to a point somewhere near the middle of their respective diametric ranges. FIG. 5 shows the automatic transmission of FIGS. 3 and 4 in a state with sufficient drive forces acting upon it to fully compress the front mechanism 730 and fully expand the rear mechanism 750, such as when a bicycle is being ridden uphill and the rider is applying a relatively high pedal force. This state corresponds to the lowest torque ratio that this embodiment of the invention offers and is comparable to the lowest gear of a traditional bicycle transmission. As such, as increasing drive forces are applied to the automatic transmission, the diameter of the front mechanism 730 smoothly and continuously transitions from larger to smaller diameters while the diameter of the rear mechanism 750 smoothly and continuously transitions from smaller to larger diameters. During use, as the drive forces increase or decrease and/or as the resistive forces increase or decrease, the diameters of the front mechanism 730 and rear mechanism 750 automatically and continuously adjust to the forces. In this way, the automatic transmission automatically adjusts to the forces such that no manual selection of gears is needed and the varying diameters of the front and rear mechanisms 730, 750 make it unnecessary to have multiple sizes of selectable sprockets.

FIG. 3, FIG. 4, and FIG. 5 each illustrate an exemplary path which the drive chain 701 may follow as it meshes with and engages sprockets located on the front mechanism 730, rear mechanism 750, and chain tensioner 702 throughout the given range of operation. The length of drive chain 701 which is engaged in transferring force varies during operation due to changing diameters of the front mechanism 730 and rear mechanism 750; therefore, the various embodiments may be equipped with a chain tensioner 702 to take up excess length of drive chain 701 during operation. The embodiments shown in FIG. 3, FIG. 4, and FIG. 5 are configured with a Metric 06B sized sprocket and roller chain combination; but a variety of other roller chain and associated sprocket sizes and types may be used to facilitate functionality such as ANSI 41 or Metric 05B, for example.

Alternatively, other types of drive components such as a drive belt used in place of the chain and corresponding drive pulleys used in place of each sprocket may be used due to the substantially planar alignment of these drive components being maintained within the system during operation. In this case, each sprocket on both the front mechanism 730 and rear mechanism 750 would be replaced by a drive pulley which operates in a similar way to the otherwise described sprockets by locking in the direction that enables the transfer of drive forces and being able to rotate in the other direction.

Similarly, the drive chain would be replaced by a drive belt which corresponds to the drive pulleys being used and may follow a similar path as the drive chain which is otherwise described herein.

Additionally, a variety of chain tensioner types could be used to remove excess slack in the chain; such as the rotationally actuated tensioner 702 shown in the current embodiment, or alternative types such as a linearly actuated tensioner, for example. These, and various other means methods and combinations thereof, can be easily imagined and should be considered within the spirit and scope of the currently disclosed inventions.

Figure 6:
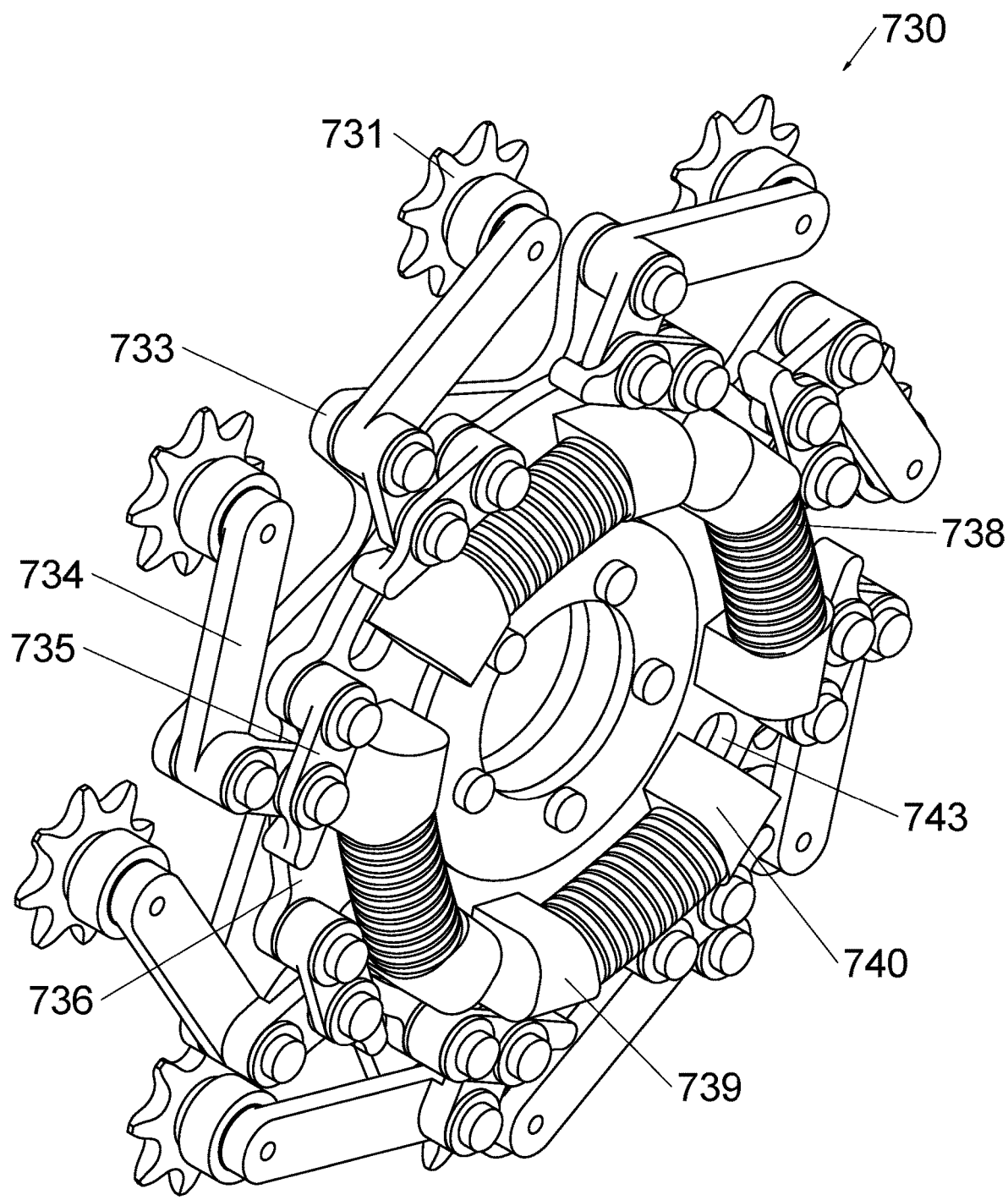
FIG. 6 is an isometric view of a front mechanism, according to various embodiments, in a state near the middle of its diametric range.

FIG. 6 is an isometric view of the front mechanism 730 in a partially compressed state. In this embodiment, the bicycles crank (not shown) is attached directly to the main plate 733 of the assembly. When a sufficient cranking torque is applied to the assembly, such as by manual and/or motorized power, the main plate 733 is driven in a forward rotation about the crank axis. This forward rotation of the main plate 733 forces each of its attached sprocket arms 734 and associated sprockets 731 to revolve in a forward direction about the crank axis. When sufficient drive forces are applied, the presence of a one-way locking bearing in each sprocket will enable at least one sprocket 731 to lock and pull the drive chain in a forward direction around its path.

As the diameter of the front mechanism 730 changes, sprockets which are engaged with the drive chain (not shown), but not locked and transferring drive force, may rotate in the non-locking direction about their axes to allow the length of chain between each sprocket 731 to change. As drive forces are increased and the front mechanism's pattern of sprockets is compressed, the length of chain between each engaged sprocket must decrease. Since each sprocket 731 is only able to rotate in the direction which doesn't transfer drive force, the sprocket which is engaged in the closest proximity to where the chain enters its engagement with the front mechanism 730 will be forced to lock so that any other engaged sprockets will be able to roll toward that sprocket along the chain allowing the length of chain between each engaged sprocket to decrease while the front mechanism 730 is compressed. When the next sprocket 731 in the front mechanism's rotation comes into its engagement with the chain, if the drive forces are sufficient to continue compressing the front mechanism's pattern of sprockets, that sprocket will take over being the activated and locked sprocket which is transferring drive force; thus, allowing the previously locked sprocket to unlock and roll toward the activated sprocket allowing the length of chain between those sprockets to decrease.

At certain points of actuation, multiple engaged sprockets may be locked; such as when the activation is changing from one sprocket to another or when drive forces are stable and the front mechanism 730 is neither compressing or expanding. In the case of drive forces being sufficient to propel the front mechanism 730 forward, but decreasing while doing so, the sprocket which is engaged with the chain in the closest proximity to where the chain exits its engagement with the front mechanism 730 will be forced to lock as the diameter of the front mechanism's pattern of sprockets increases; allowing any other engaged sprockets to roll away from that locked sprocket and the length of chain between each sprocket to increase.

During forward rotation of the front mechanism 730, each sprocket arm 734 is oriented such that its connection to the main plate 733 is in a leading position and closer to the front mechanism's axis of rotation relative to its associated sprocket 731. As an activated sprocket 731 attempts to pull the chain (not shown) forward, the drive forces create a torque on its associated sprocket arm 734 in a rotational direction relative to its connection to the main plate 733 that forces the sprocket inward toward the front mechanism's axis of rotation. As drive forces compel each sprocket arm 734 to rotate inward, force is transferred through its corresponding link 735 which is rotatably connected to another point on each sprocket arm 734. As forces are transferred through an activated link 735, a torque is imparted on the rotor plate 736 which compels it to counter-rotate relative to the main plate 733.

In this embodiment, a plurality of compression springs 738 introduces a force bias to the relative rotation between the rotor plate 736 and the main plate 733 within the allowed operating range. This spring force bias imparts a torque on the rotor plate 736 in a direction relative to the main plate 733 that resists the torque imparted through each activated link 735 as drive forces are applied. According to this embodiment, when the opposing torques are imbalanced in a direction that moves each sprocket arm's connection with the main plate 733 toward its associated link's connection with the rotor plate 736, each sprocket arm 734 will rotate about its connection to the main plate 733 in a direction that causes each sprocket 731 to move inward toward the front mechanism's axis of rotation, thus decreasing the diameter of the sprocket pattern and the path for the drive chain (not shown) to follow. Conversely, when the opposing torques are imbalanced in a direction that moves each sprocket arm's connection with the main plate 733 away from, according to some embodiments, its associated link's connection with the rotor plate 736, each sprocket arm 734 will rotate about its connection to the main plate 733 in a direction that causes each sprocket 731 to move outward away from the front mechanism's axis of rotation, thus increasing the diameter of the sprocket pattern and the path for the drive chain to follow.

Figure 7:
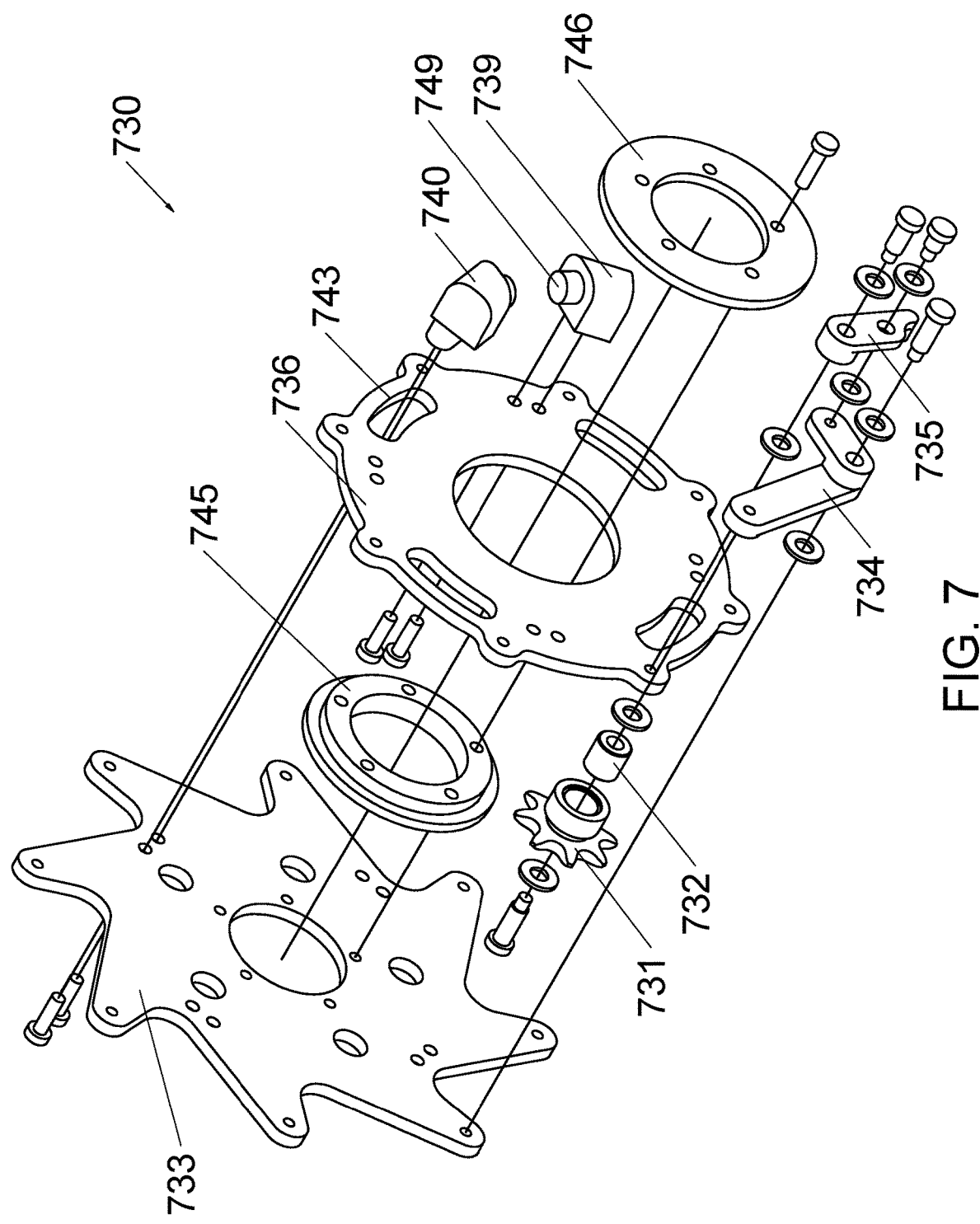
FIG. 7 is an exploded view of a front mechanism, according to various embodiments, with one set of actuating components shown.

FIG. 7 is an exploded view of the front mechanism 730 with only one set of actuating components shown. Each sprocket 731 is configured with a one-way locking bearing 732 and connected to a sprocket arm 734 which is able to pivot about its connection to the main plate 733. The rotor plate 736 is able to rotate in either direction relative to the main plate 733 about a common axis of rotation but is otherwise substantially constrained in its position as it rotates on a bearing surface within a bearing housing created by the bearing block 745 and bearing cap 746. Each sprocket arm 734 is also connected to the rotor plate 736 through a link 735 that is able to rotate about both of its connection points. This linkage configuration compels the rotation of each sprocket arm 734 about its connection to the main plate 733 to be simultaneous with any counter-rotation of the rotor plate 736 relative to the main plate 733.

Each spring (not shown) is constrained at one end to the rotor plate 736 via a rotor plate spring mount 739 and at its other end to the main plate 733 via a main plate spring mount 740 which passes through a hole 743 in the rotor plate 736. Each rotor plate spring mount 739 and main plate spring mount 740 is configured with a feature to hold the end of each spring from sliding out of place. In this embodiment, the end of each spring encompasses a cylindrical protrusion 749 on each spring mount.

Figure 8:
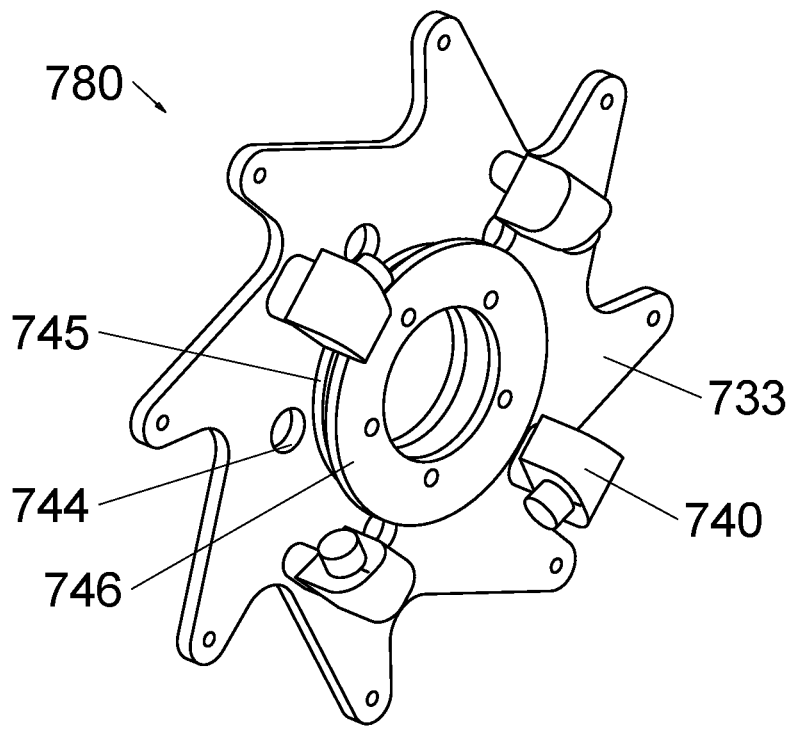
FIG. 8 is an isometric view of a sub-assembly from a front mechanism, according to various embodiments.

FIG. 8 shows an embodiment of the main structure 780 of a front mechanism, in which the main plate 733 is attached to several other structural components such that no relative motion is allowed between them. These affixed components include a bearing block 745 and bearing cap 746, which capture the rotor plate (not shown) when assembled, as well as the main plate spring mounts 740. During operation, other components (not shown) actuate relative to the main structure 780. In the current embodiment, the main plate 733 is configured with attachment features 744 which allow the front mechanism to be fastened to one of the bicycle's crank arms with screws. Alternatively, the inner surface of the hole through the central axis of the main structure 780 could be configured to attach to the bicycle's crank assembly. For example, splines positioned longitudinally through the central hole of the main structure 780 could mesh with and engage corresponding grooves positioned longitudinally along a shaft driven by manual (bodily) or motorized power.

Figure 9:
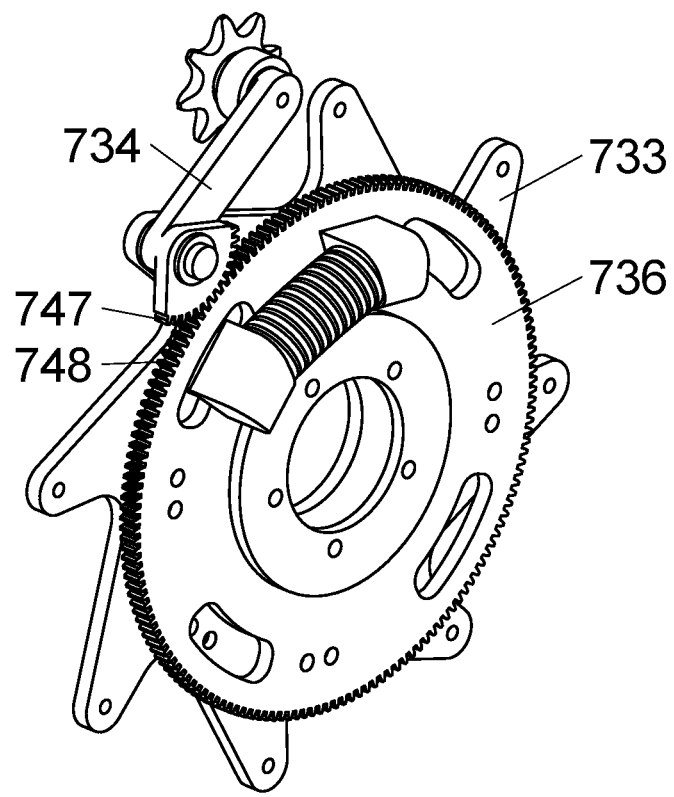
FIG. 9 is an isometric view of an alternative embodiment of a front mechanism.

FIG. 9 illustrates an alternative embodiment of this invention in which the links connecting each sprocket arm to the rotor plate are replaced by gear teeth which engage between each sprocket arm 734 and the rotor plate 736. The sprocket arm gear teeth 747 are positioned concentrically about each sprocket arm's connection with the main plate 733 and are configured to engage with corresponding rotor plate gear teeth 748 which are positioned concentrically about the rotor plate's rotational axis. This gearing configuration ensures that any counter-rotation of the rotor plate 736 relative to the main plate 733, is simultaneous with the rotation of each sprocket arm 734 relative to its connection with the main plate 733. It should be understood that, while only one sprocket arm 734 is shown, this is for ease of demonstration only and the other sprocket arms would include geared teeth and be positioned around the rotor plate 736 like the depicted sprocket arm 734.

Figure 10:
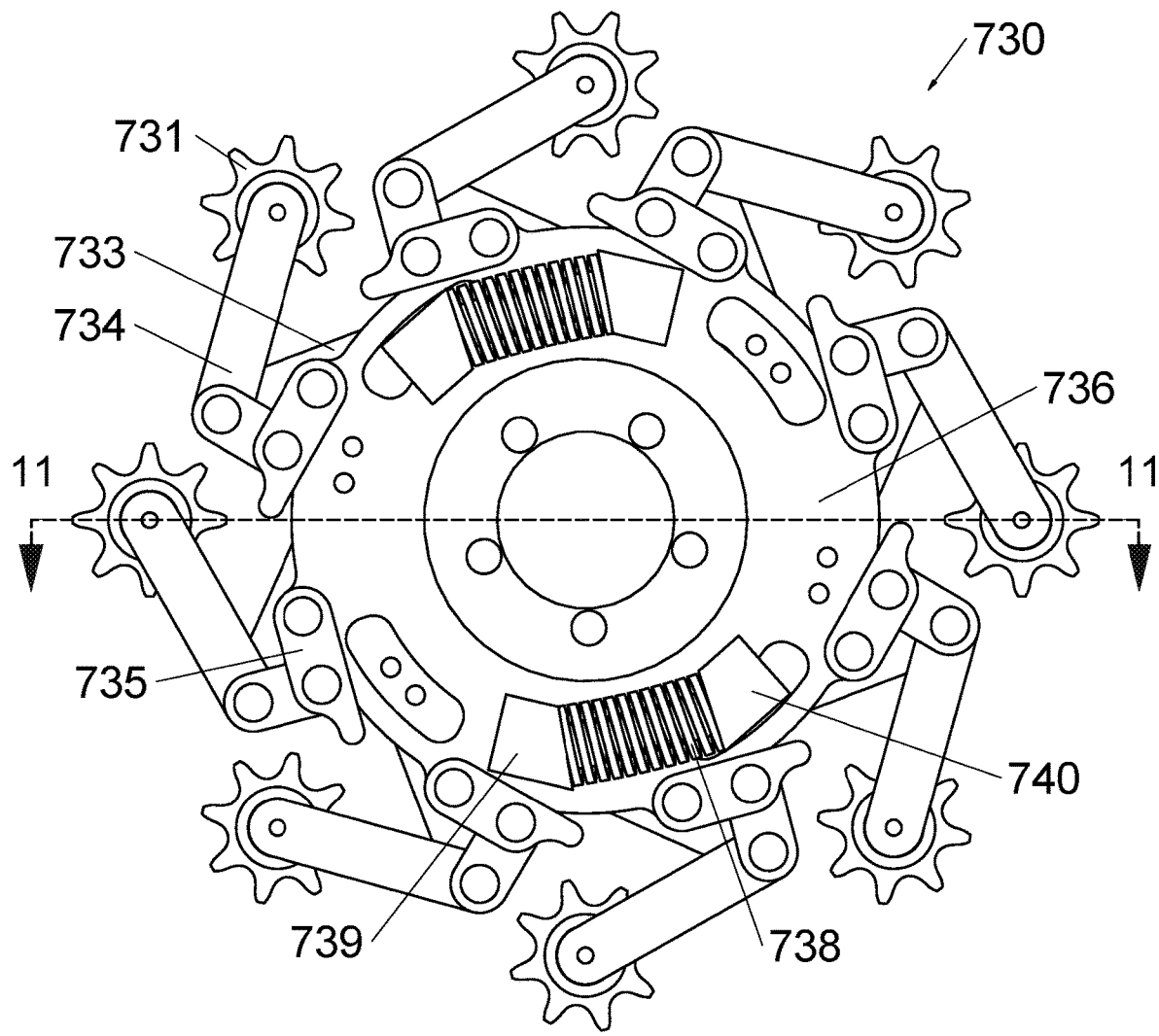
FIG. 10 is an orthographic side view of a front mechanism, according to various embodiments, in a state near the middle of its diametric range.

FIG. 10 is an orthographic view of the front mechanism 730 in a partially compressed state with some of the assembly's components removed for clarity. In this embodiment, all of the sprockets 731 within the front mechanism 730 are of the same design as each other. Similarly, each sprocket arm 734, link 735, spring 738, rotor plate spring mount 739, and main plate spring mount 740 are of the same design as their like parts within the front mechanism 730. The connection points between the sprocket arms 734 and main plate 733 are substantially evenly spaced from each other and substantially co-radial to the central axis of the main plate 733. Additionally, the connection points between the links 735 and rotor plate 736 are substantially evenly spaced from each other and substantially co-radial to the central axis of the rotor plate 736. This radial pattern of linkages compels the plurality of sprockets to move substantially in unison as the front mechanism 730 is operated within its allowed range.

The embodiment shown is designed to include eight sprockets 731, each with an associated sprocket arm 734 and link 735, and four compression springs 738, each with an associated rotor plate spring mount 739 and main plate spring mount 740. The number of sprockets 731, and associated sprocket arms 734 and links 735 within the assembly could be varied while still enabling the functionality of the invention. Likewise, the number of springs 738, and associated rotor plate spring mounts 739 and main plate spring mounts 740 within the assembly could also be varied while still enabling the functionality of the invention. For example, in various embodiments there could be between 5 and 12 sprockets, between 7 and 11 sprockets, or between 8 and 10 sprockets, evenly spaced. In various such embodiments, there could be between 2 and 6 compression springs, such as 3 to 4 compression springs. In one alternative embodiment, there could be ten sets of sprockets with associated components and three sets of springs with associated components, or other numerical combinations than those mentioned as well.

Figure 11:
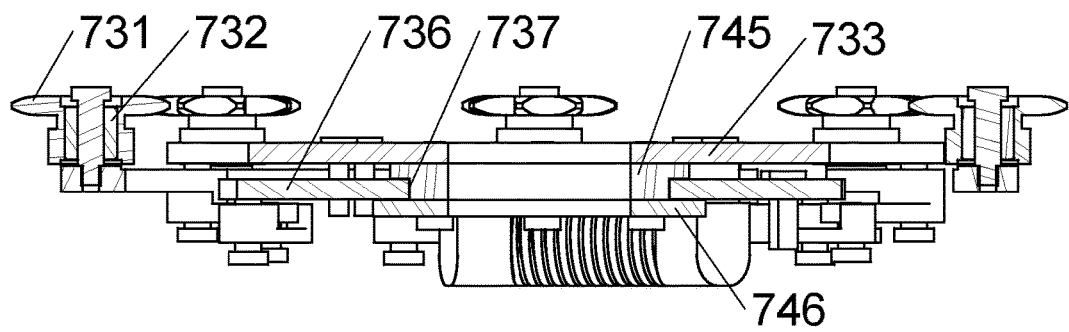
FIG. 11 is a cross-sectional view across section line 11-11 of the front mechanism of FIG. 10.

FIG. 11 is a cross-sectional view of the front mechanism 730 from FIG. 10. This view illustrates the relative positions of components and an example of the margins between them. The rotor plate 736 rotates within a bearing housing 737 created by the bearing block 745 and bearing cap 746. Appropriate lubrication, and/or bearing components may be included within the bearing housing 737 to minimize friction between components and reduce wear. The position of each one-way locking bearing 732 within each sprocket 731 can also be seen here. In this embodiment, each one-way locking bearing 732 is positioned concentrically around a shoulder screw which is attached to its respective sprocket arm with left-hand threading to prevent the shoulder screw from unscrewing as drive forces are applied to an activated, locked sprocket.

Figure 12:
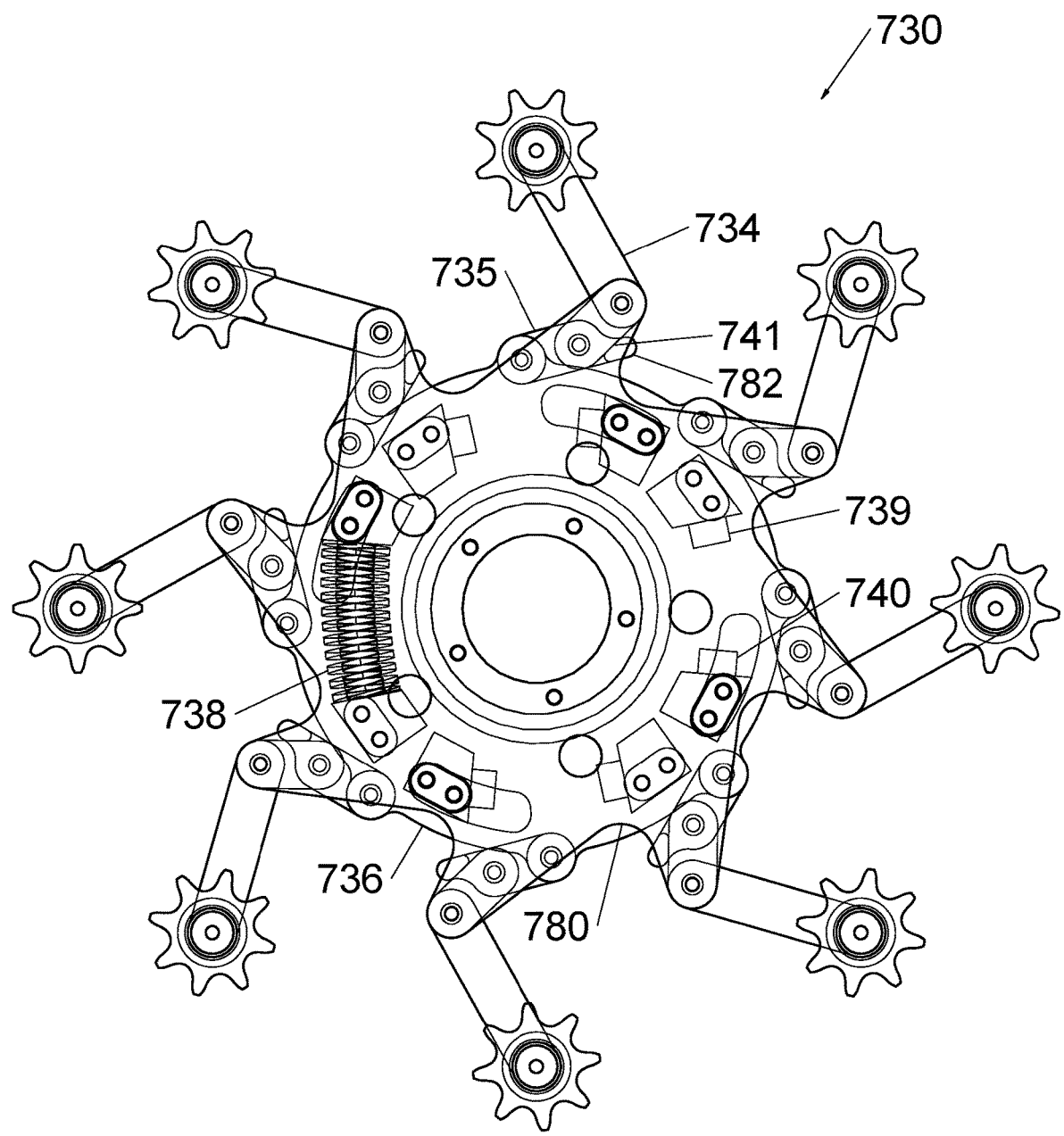
FIG. 12 is a transparent side view illustrating a front mechanism, according to various embodiments, at the largest extent of its diametric range.

FIG. 12 is a transparent view of a front mechanism 730 in a diametrically expanded state illustrating the profiles of various components. The front mechanism 730 is prevented from expanding beyond this point by means of a mechanical high stop 741 which occurs when an edge surface of each link 735 shoulders against an adjacent edge surface of its associated sprocket arm 734. This mechanical high stop 741 limits any further rotation of the sprocket arm 734 about its connection to the main structure 780. In this embodiment, the springs 738 (some not shown) are slightly compressed when the front mechanism 730 is in a fully expanded state to create a preload. A small preload serves to minimize slop and excess vibration by maintaining contact between component surfaces through which forces are transferred; while a slight amount of pre-compression reserves as much actuation range as possible before the springs become fully compressed. While this embodiment includes a mechanical stop feature 782 incorporated directly into each link to function as the mechanical high stop, other suitable features or hardware could be utilized to prevent one or more parts from rotating beyond an allowed range which would effectively stop the front mechanism from actuating any further. For example, the main structure 780 and rotor plate 736 may be configured with features that contact each other and limit relative rotation at the beginning and end of an allowed range, such as a dowel pin protruding from one plate and traveling within a slot configured into the other plate.

Figure 13:
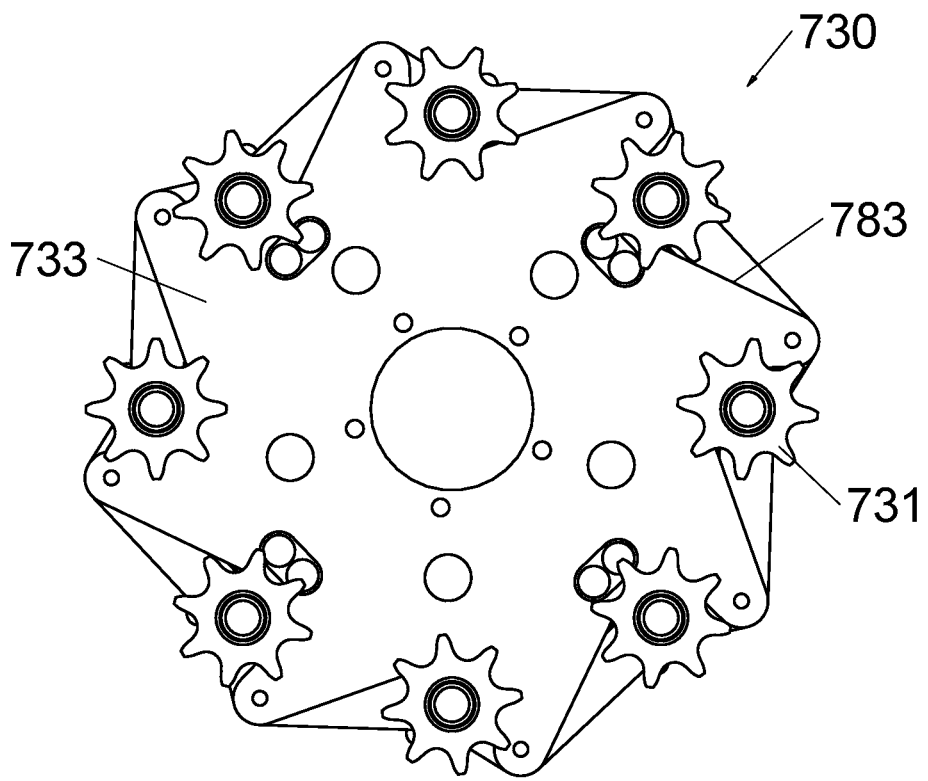
FIG. 13 is an orthographic side view of a front mechanism, according to various embodiments, at the smallest extent of its diametric range.

FIG. 13 shows an embodiment of the front mechanism 730 from the crank mounting side in a fully compressed state. The main plate 733 includes cutout sections 783 around its perimeter which allow each sprocket 731 to travel further inward toward the front mechanism's axis of rotation; resulting in a diametrically smaller pattern of sprockets, a shorter path for the endless chain to follow around the bicycle's crank axis, and an overall lower gear ratio.

Figure 14:
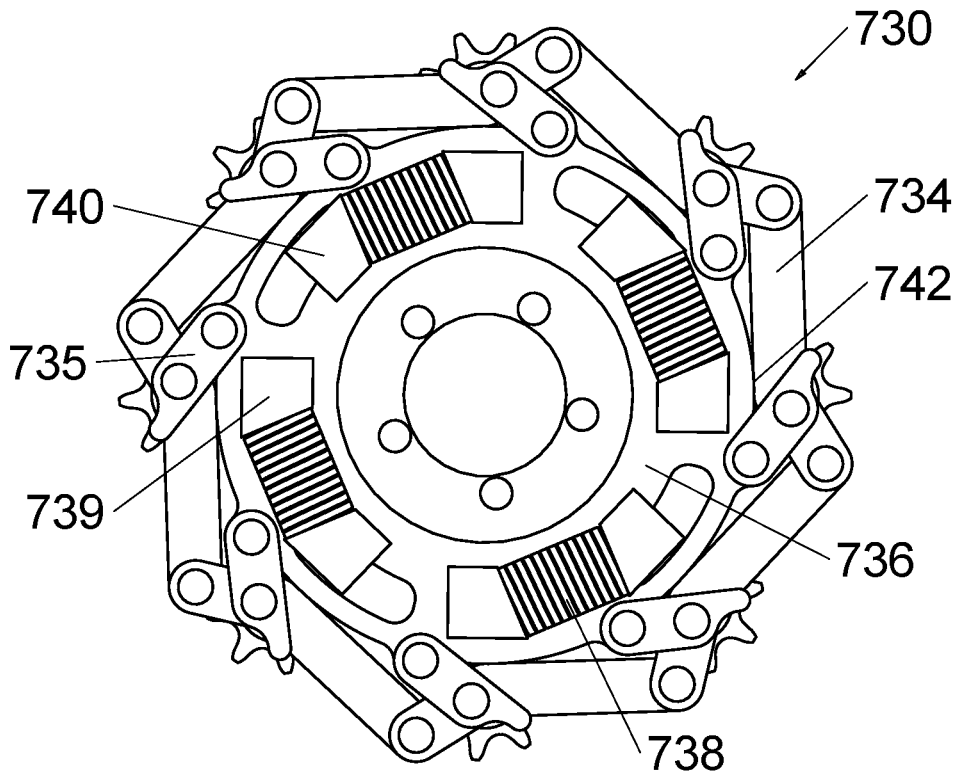
FIG. 14 is an opposing side view of the front mechanism of FIG. 13.

FIG. 14 shows an opposing side view of the same embodiment from FIG. 13. The front mechanism 730 is prevented from being compressed beyond this point by means of a mechanical low stop 742 which occurs when contact is made between an edge surface of each sprocket arm 734 and an adjacent edge surface of the rotor plate 736. In this embodiment, the springs 738 are almost fully compressed when the conditions for the mechanical low stop 742 are met. However, in other embodiments, the springs 738 may be able to fully compress, limiting any further diametric compression of the front mechanism 730 and negating the need for a mechanical low stop.

To a person skilled in this technological area, it will be apparent that the response of the front mechanism's compression relative to the drive forces applied is dependent on the summation of geometric and mechanical variables within the mechanism and therefore could be adjusted to achieve the desired response including both the response curve and the force range desired. A few examples of variables within a front mechanism 730 that could be adjusted would include the spring rate, the distance from each sprocket arm's connection with the main plate to its associated sprocket, and the point where each link connects to its associated sprocket arm.

Figure 15:
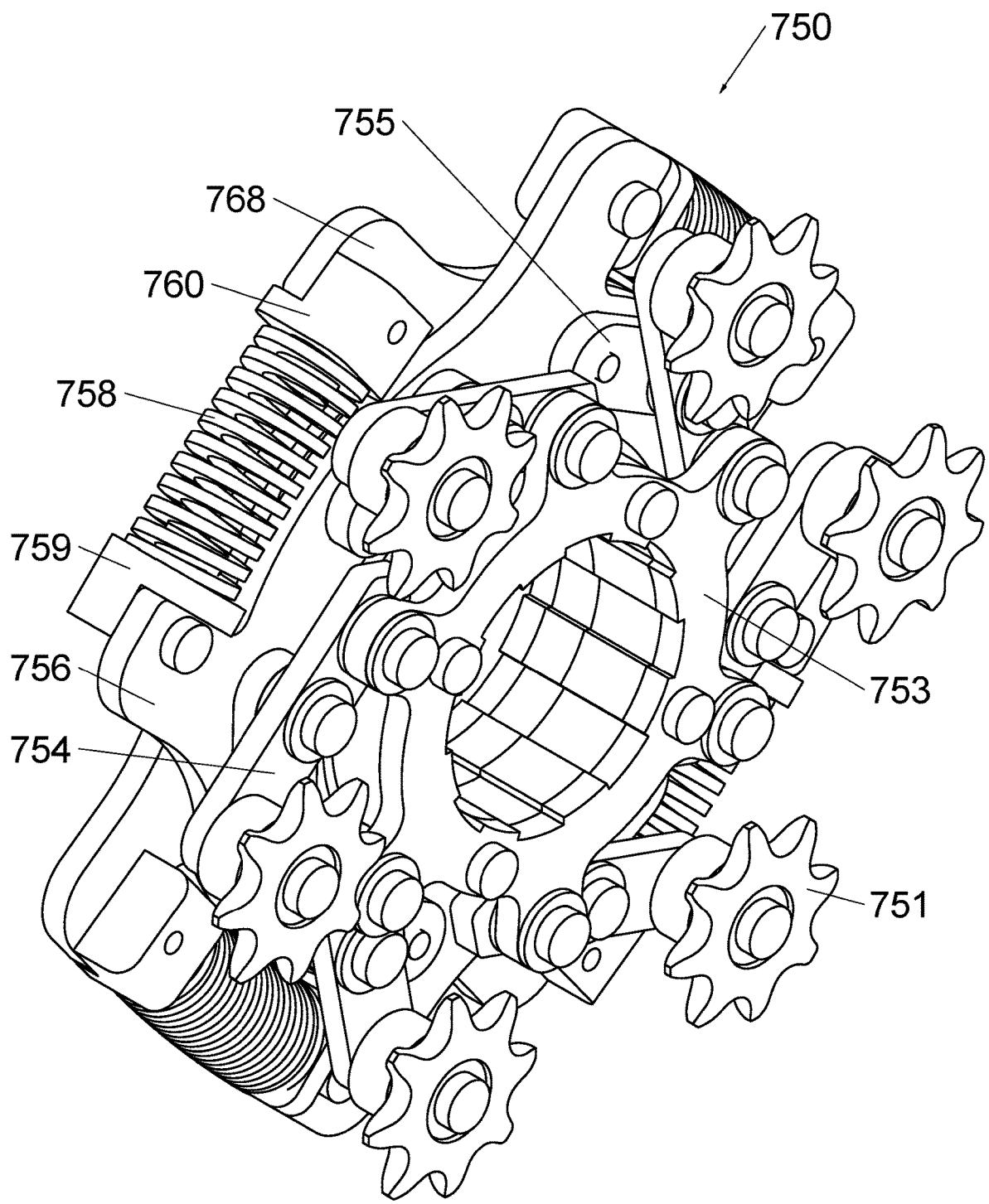
FIG. 15 is an isometric view of a rear mechanism, according to various embodiments, in a state near the middle of its diametric range.

FIG. 15 is an isometric view of a rear mechanism 750 in a partially expanded state. When a sufficient drive force is transferred through the drive chain (not shown), the presence of a one-way locking bearing in each sprocket will enable at least one sprocket 751 to lock and be pulled in a forward direction along the path of the drive chain. Each sprocket arm 754 is oriented such that its connection to the main plate 753 is in a leading position and closer to the rear mechanism's axis of rotation relative to its associated sprocket 751. As an activated sprocket 751 is pulled forward, the drive forces create a torque on its associated sprocket arm 754 in a rotational direction about its connection to the main plate 753 that forces the sprocket outward away from the rear mechanism's axis of rotation. As drive forces compel each sprocket arm 754 to rotate outward, force is transferred through its corresponding link 755 which is rotatably connected to another point on the associated sprocket arm 754. As force is transferred through an activated link 755, a torque is imparted on the rotor plate 756 which compels it to counter-rotate relative to the main plate 753.

As the diameter of the rear mechanism 750 changes, sprockets which are engaged with the drive chain (not shown), but not locked and transferring drive force, may rotate in the non-locking direction about their axes to allow the length of chain between each sprocket 751 to change. As drive forces are increased and the rear mechanism 750 is forced to expand, the length of chain between each engaged sprocket must increase. Since each sprocket 751 is only able to rotate in the direction which doesn't transfer drive force, the sprocket which is engaged in the closest proximity to where the chain enters its engagement with the rear mechanism 750 will be forced to lock so that any other engaged sprockets can roll away from that sprocket along the chain; thus, allowing the length of chain between each engaged sprocket to increase as the rear mechanism 750 expands. When the next sprocket 751 in the rear mechanism's rotation comes into its engagement with the chain, if the drive forces are sufficient to continue expansion of the rear mechanism's pattern of sprockets, that sprocket will take over being the activated and locked sprocket which is transferring drive force; thereby, allowing the previously locked sprocket to unlock and roll away from the activated sprocket and the length of chain between those sprockets to increase.

At certain points of actuation, multiple engaged sprockets may be locked; such as when the activation is transitioning from one sprocket to another or when drive forces are stable and the rear mechanism 750 is neither expanding or contracting. In the case of drive forces being sufficient to propel the rear mechanism 750 forward but decreasing while doing so, the sprocket which is engaged with the chain in the closest proximity to where the chain exits its engagement with the rear mechanism 750 will be forced to lock, allowing any other engaged sprockets to roll toward that locked sprocket along the chain as the diameter of the rear mechanism's pattern of sprockets decreases.

In this embodiment, a plurality of compression springs 758 introduces a force bias to the relative rotation between the rotor plate 756 and the main plate 753 through the sub plate 768 which is attached to the main plate 753 such that no relative motion is allowed between them. This spring force bias imparts a torque on the rotor plate 756 in a direction relative to the main plate 753 that resists the torque imparted through each link 755 as drive forces are applied. According to this embodiment, when the opposing torques are imbalanced in a direction that moves each sprocket arm's connection with the main plate 753 toward its associated link's connection with the rotor plate 756, each sprocket arm 754 will rotate about its connection to the main plate 753 in a direction that causes each sprocket 751 to move outward away from the rear mechanism's axis of rotation, thus increasing the diameter of the sprocket pattern and the path for the drive chain (not shown) to follow. Conversely, when the opposing torques are imbalanced in a direction that moves each sprocket arm's connection with the main plate 753 away from, according to some embodiments, its associated link's connection with the rotor plate 756, each sprocket arm 754 will rotate about its connection to the main plate 753 in a direction that causes each sprocket 751 to move inward toward the rear mechanism's axis of rotation, thus decreasing the diameter of the sprocket pattern and the path for the drive chain to follow.

Figure 16:
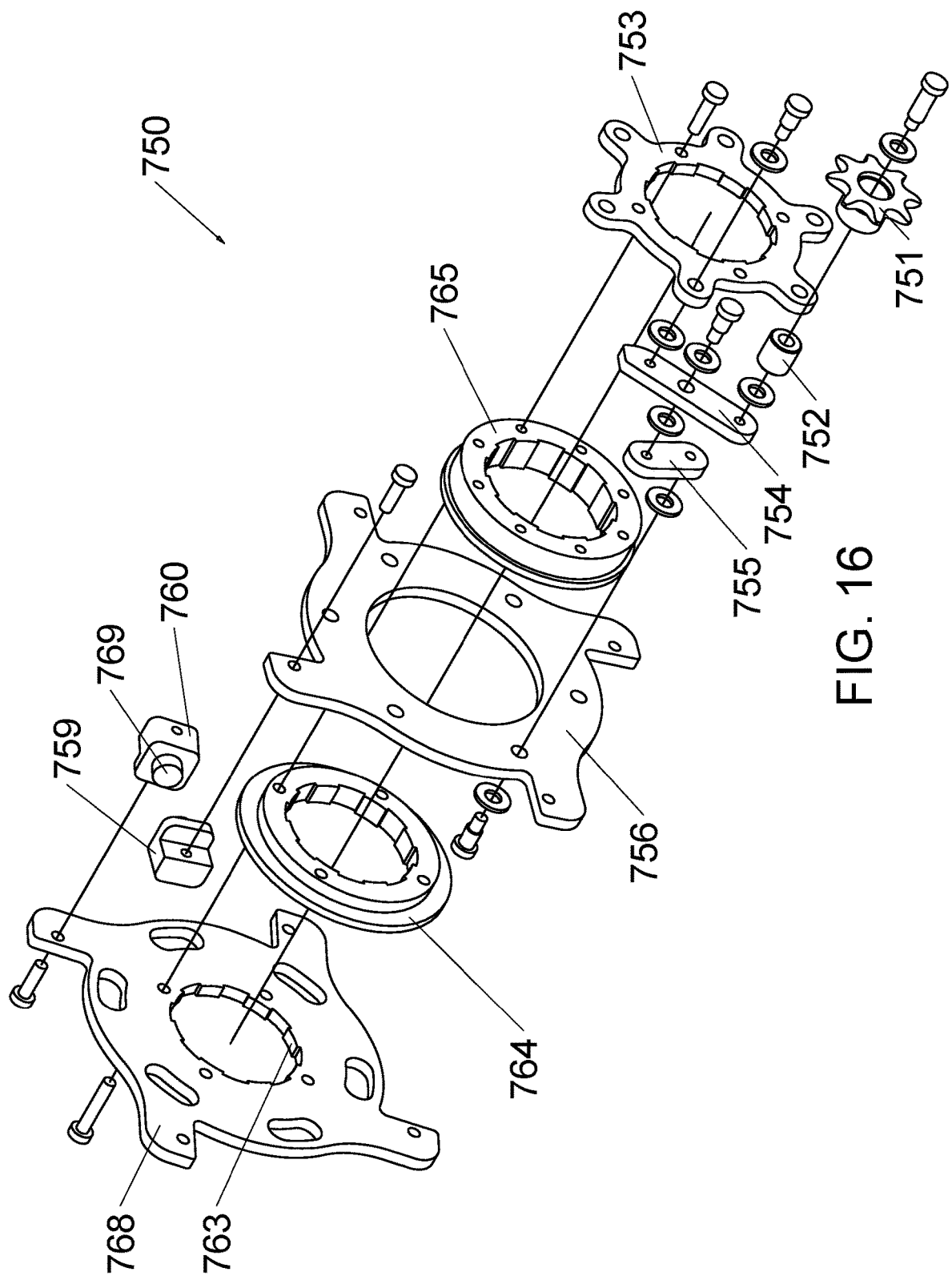
FIG. 16 is an exploded view of a rear mechanism, according to various embodiments, with one set of actuating components shown.

FIG. 16 is an exploded view of a rear mechanism 750 with only one set of actuating components shown. Each sprocket 751 is configured with a one-way locking bearing 752 and connected to a sprocket arm 754 which is able to pivot about its connection to the main plate 753. The rotor plate 756 is able to rotate in either direction relative to the main plate 753 about a common axis of rotation but is otherwise substantially constrained in its position as it rotates on a bearing surface within a bearing housing created by the bearing block 764 and bearing cap 765. Each sprocket arm 754 is also connected to the rotor plate 756 through a link 755 that is able to rotate about both of its connection points. This linkage configuration compels the rotation of each sprocket arm 754 about its connection to the main plate 753 to be simultaneous with any counter-rotation of the rotor plate 756 relative to the main plate 753.

Each spring (not shown) is constrained at one end to the rotor plate 756 via a rotor plate spring mount 759 and at its other end to the sub plate 768 via a sub plate spring mount 760. Each rotor plate spring mount 759 and sub-plate spring mount 760 may be configured with a feature to hold the end of each spring from sliding out of place. In this embodiment, the end of each spring encompasses a cylindrical protrusion 769 on each spring mount.

Figure 17:
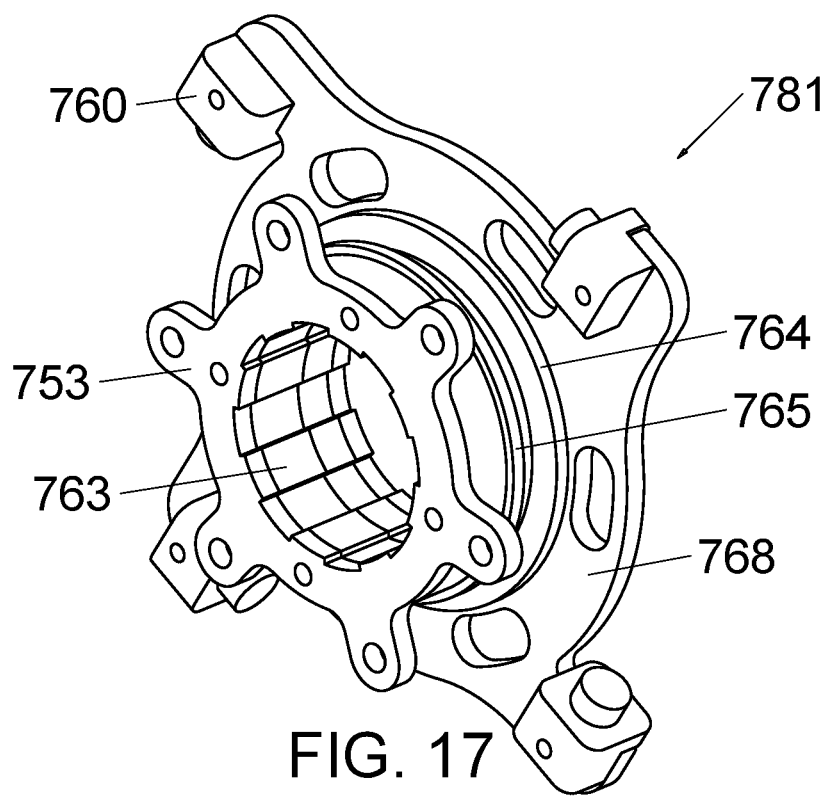
FIG. 17 is an isometric view of a sub-assembly from a rear mechanism, according to various embodiments.

FIG. 17 shows an embodiment of the main structure 781 of a rear mechanism. The main plate 753 is attached to several other structural components such that no relative motion is allowed between them. These affixed components include a sub plate 768 which holds the sub plate spring mount blocks 760 as well as a bearing block 764 and a bearing cap 765 which capture the rotor plate (not shown) when assembled. During operation, other components (not shown) actuate relative to the main structure 781. In the current embodiment, the rear mechanism's main structure 781 is configured to be constrainable to the bicycle's rear wheel hub (not shown) with splines 763 which are created by the alignment of spline sections positioned around the inner diameter of applicable components within the main structure 781. The splines 763 are positioned longitudinally through the inner diameter of the main structure 781 and are configured to slide into corresponding grooves positioned longitudinally along the outside diameter of the bicycle's rear wheel hub; thereby, preventing any relative rotation between the bicycles rear wheel hub and the rear mechanism's main structure 781. The rear mechanism can be prevented from unwanted movement in the longitudinal direction relative to the rotational axis of the rear wheel hub by limiting the distance within the grooves that the splines 763 may slide. This limitation can occur when the end of at least one spline contacts the end of its corresponding groove, or when an appropriate side surface of the rear mechanism contacts another feature or component incorporated onto the rear wheel hub after assembly.

Figure 18:
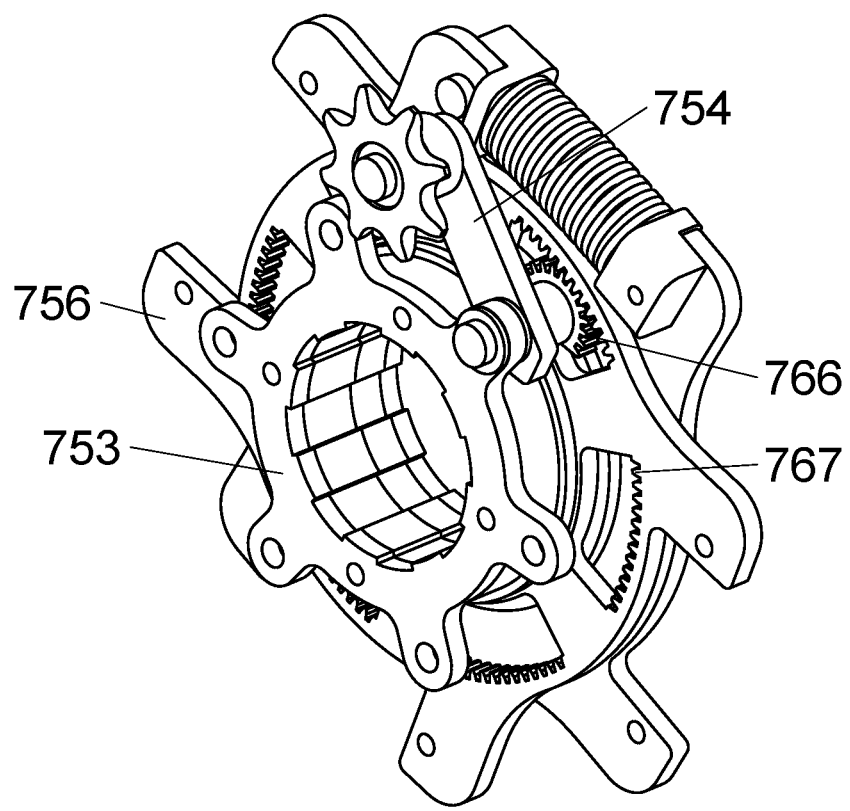
FIG. 18 is an isometric view of an alternative embodiment of a rear mechanism.

FIG. 18 illustrates an alternative embodiment of this invention in which the links connecting each sprocket arm to the rotor plate are replaced by gear teeth which engage between each sprocket arm 754 and the rotor plate 756. The sprocket arm gear teeth 766 are positioned concentrically about each sprocket arm's connection with the main plate 753 and are configured to engage with corresponding rotor plate gear teeth 767 which are positioned concentrically about the rotor plate's rotational axis. This gearing configuration ensures that any counter-rotation of the rotor plate 756 relative to the main plate 753 is simultaneous with the rotation of each sprocket arm 754 relative to its connection with the main plate 753. It should be understood that, while only one sprocket arm 754 is shown, this is for ease of demonstration only and the other sprocket arms would include geared teeth and be positioned around the rotor plate like the depicted sprocket arm 754.

Figure 19:
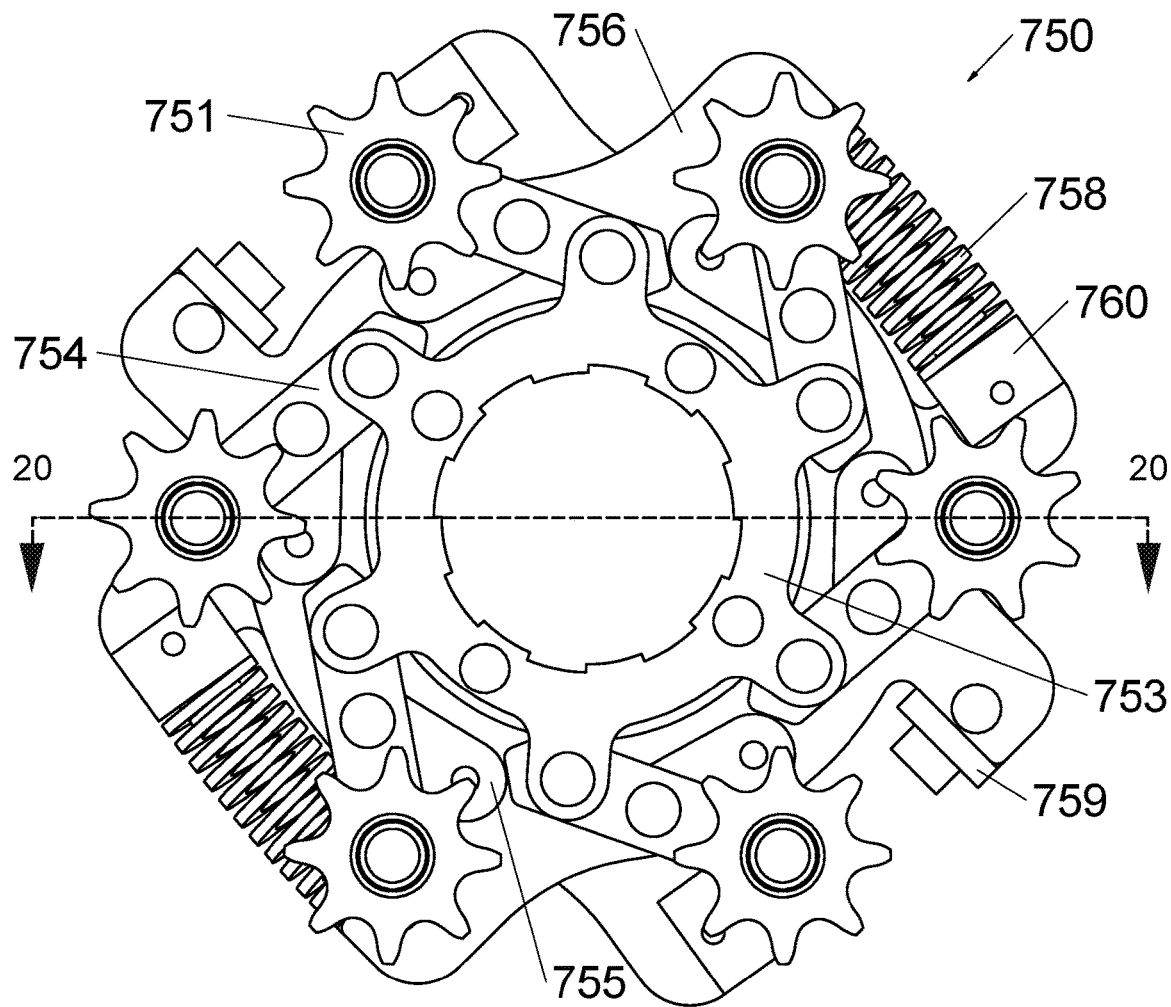
FIG. 19 is an orthographic side view of a rear mechanism, according to various embodiments, in a state near the middle of its diametric range.

FIG. 19 is an orthographic view of a rear mechanism 750 in a partially expanded state with some of the assembly's components removed for clarity. In this embodiment, all of the sprockets 751 within the rear mechanism 750 are of the same design as each other. Similarly, each sprocket arm 754, link 755, spring 758, rotor plate spring mount 759, and sub plate spring mount 760 are of the same design as their like parts within the rear mechanism 750. The connection points between the sprocket arms 754 and main plate 753 are substantially evenly spaced from each other and substantially co-radial to the central axis of the main plate 753. Additionally, the connection points between the links 755 and rotor plate 756 are substantially evenly spaced from each other and substantially co-radial to the central axis of the rotor plate 756. This radial pattern of linkages compels the plurality of sprockets to move substantially in unison as the rear mechanism 750 is operated within its allowed range.

The embodiment shown is designed to include six sprockets 751, each with an associated sprocket arm 754 and link 755, and a plurality of four compression springs 758, each with an associated rotor plate spring mount 759 and sub plate spring mount 760. However, the number of sprockets 751, and associated sprocket arms 754 and links 755 within the assembly could be varied while still enabling the functionality of the invention, and the number of springs 758, and associated rotor plate spring mounts 759 and sub plate spring mounts 760 within the assembly could also be varied while still enabling the functionality of the invention. For example, alternative embodiments could include 4 to 9 sprocket arms, or 5 to 8 sprocket arms, and could include 3 to 6 springs, or 4 to 5 springs. In one example, it may include seven sets of sprockets with associated components and five sets of springs with associated components, or other numerical combinations than those mentioned as well.

Figure 20:
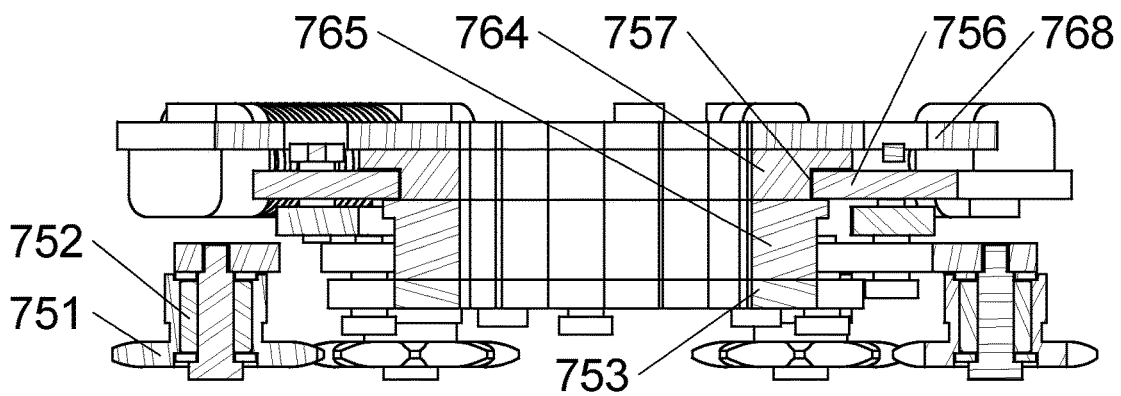
FIG. 20 is a cross-sectional view of the rear mechanism of FIG. 19 across section line 20-20.

FIG. 20 is a cross-sectional view of the rear mechanism 750 from FIG. 19. This view illustrates the relative positions of components and an example of the margins between them. The rotor plate 756 rotates within a bearing housing 757 created by the bearing block 764 and bearing cap 765. Appropriate lubrication, and/or bearing components may be included within the bearing housing 757 to minimize friction between components and reduce wear. The position of each one-way locking bearing 752 within each sprocket 751 can also be seen here.

Figure 21:
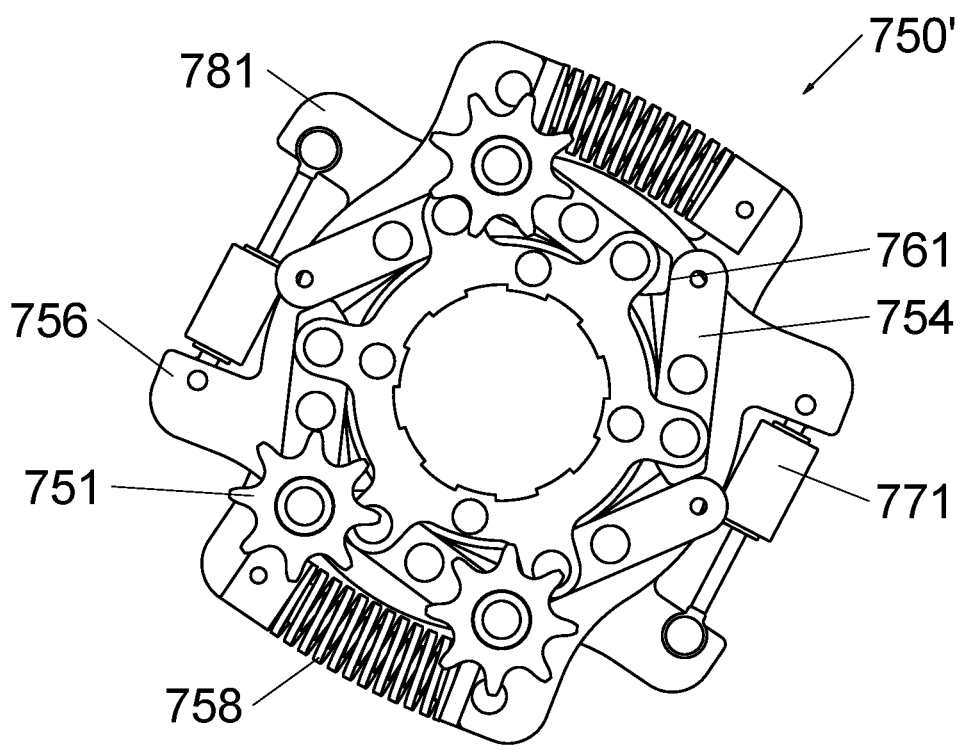
FIG. 21 is a side view of an embodiment of a rear mechanism which includes actuation dampers, at the smallest extent of its diametric range.

FIG. 21 shows an orthographic view of an alternative embodiment of a rear mechanism 750' which includes dampers 771 rotatably connected on each end to the rotor plate 756 on one end and the main structure 781 on the other end, but otherwise may be the same as rear mechanism 750 described throughout this application and the descriptions of rear mechanism 750 and its uses apply fully to alternative rear mechanism 750'. The dampers 771 shown in this embodiment are of a typical fluid displacement type, sometimes referred to as dashpot dampers, in which actuation of the damper 771 forces fluid through one or more orifices resulting in a viscous friction that provides a resistance which is proportional to the velocity of actuation, and therefore a damping effect. Various configurations of monotube type dashpot dampers may be used in some embodiments in which an internal piston is able to move longitudinally back and forth through a fluid filled cylinder, thereby forcing the fluid within the cylinder to pass either around the piston or through one or more orifices or valves incorporated into the piston. In the case of a configuration containing a valve or valves, the motion of the piston may be restricted by viscous friction in one direction, but unrestricted or less restricted in the other direction. In the embodiment shown, the internal piston is connected to one end of a guided shaft which may be rotatably connected at its other end to either the rotor plate 756 or the main structure 781; and the fluid filled cylinder which guides the shafts movement to be longitudinal relative to the cylinder may be rotatably connected to the other of the rotor plate 756 or main structure 781.

The resistance provided by a fluid displacement damper increases as the velocity of actuation increases; thereby, forcing the damper 771 and overall rear mechanism 750' to actuate more slowly. This damping effect is especially beneficial in the case of decreasing drive forces and the pattern of sprockets retracting to a smaller diameter. The slowed retraction allows more time for any slack in the chain (not shown) to be taken up by the rest of the system, which helps the chain maintain engagement with the sprockets 751 (some not shown for clarity) as they retract inward toward the rear mechanism's axis of rotation and away from the chain's previous path. Any included springs 758 may be positioned in an evenly spaced pattern around the rear mechanism's rotational axis such as the two springs 758 shown here with an equal 180 degrees between each one. Additionally, any included dampers 771 may be positioned in an evenly spaced pattern around the rear mechanism's rotational axis; such as three dampers positioned 120 degrees apart from each other, or four dampers positioned 90 degrees apart from each other, for example.

In FIG. 21, the rear mechanism 750' is shown in a fully contracted state. The rear mechanism 750' is prevented from contracting beyond this point by means of a mechanical high stop 761 which occurs when contact is made between adjacent edge surfaces of each sprocket arm 754. This mechanical high stop 761 limits any further rotation of each sprocket arm 754 about its connection to the main structure 781. In this embodiment, the compression springs 758 are slightly compressed when the rear mechanism 750' is in a fully contracted state to create a preload. A small preload serves to minimize slop and excess vibration by maintaining contact between component surfaces through which forces are transferred; while a slight amount of pre-compression reserves as much actuation range as possible before the springs become fully compressed. While this embodiment utilizes contacting edge surfaces on each sprocket arm 754 to function as the mechanical stops, other suitable features or hardware could be used to prevent one or more parts from moving beyond an allowed range which would effectively stop the rear mechanism 750' from actuating any further. For example, features such as dowel pins could protrude from the main structure 781 in positions that limit the rotation of each sprocket arm 754 when one of its edge surfaces come into contact with its associated dowel pin.

Figure 22:
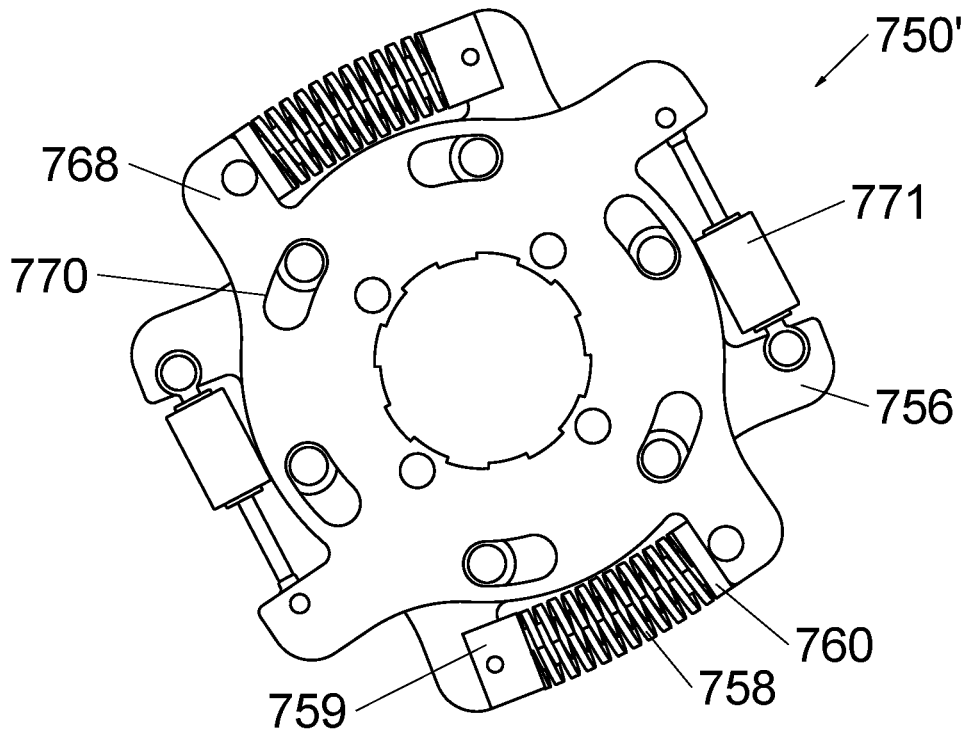
FIG. 22 is an opposing side view of the rear mechanism of FIG. 21.

FIG. 22 shows the opposing side of the rear mechanism 750' of FIG. 21. Each damper 771 provides damping to any counter rotation between the sub plate 768 and rotor plate 756 and serves to slow the contraction of the rear assembly 750' as drive forces decrease. The sub plate 768 includes clearance holes 770 which provide space for the heads of the shoulder screws, which connect the links (not shown) to the rotor plate 756, to move within. This configuration allows the sub plate 768 and rotor plate 756 to be spaced closer together; resulting in a margin between them of, for example, between about 0.1 mm and about 6 mm, or between about 1 mm and about 4 mm, or between about 1.8 mm and 2.8 mm, such as about 2.3 mm or about 2.4 mm or about 2.5 mm, according to various embodiments. This decreased margin between the sub plate 768 and rotor plate 756 helps the spring force bias to load the sub plate 768 and rotor plate 756 in a predominantly rotational direction relative to their axes. Each damper 771 is positioned such that the damping it provides is as close to the midplane between the sub plate 768 and rotor plate 756. This is achieved by attaching one end of the damper 771 to the side of the sub plate 768 which is closest to the rotor plate 756 and the other end of the damper 771 to the side of the rotor plate 756 which is closest to the sub plate 768. Similarly, each rotor plate spring mount 759 and each sub plate spring mount 760 are designed such that each spring 758 is held in a position which intersects the midplane between the sub plate 768 and rotor plate 756. Each rotor plate spring mount 759 is attached to the rotor plate 756 in an orientation which positions its cylindrical protrusion to intersect the midplane between the rotor plate 756 and sub plate 768. Additionally, each sub plate spring mount 760 is attached to the sub plate 768 in an orientation which positions its cylindrical protrusion to intersect the midplane between the rotor plate 756 and sub plate 768.

Figure 23:
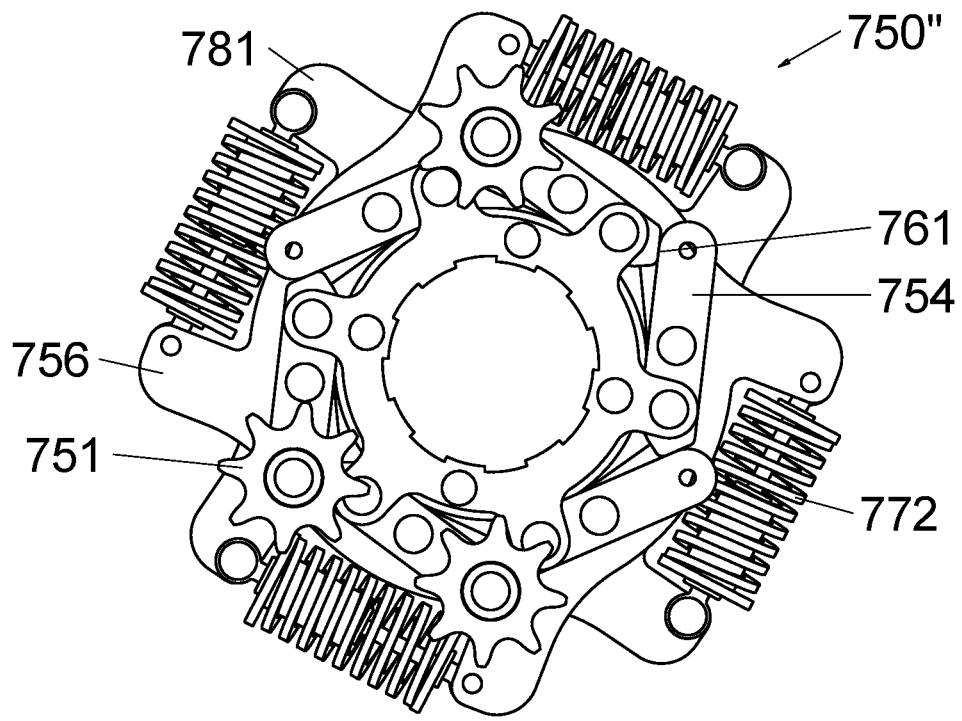
FIG. 23 is a side view of an embodiment of a rear mechanism which includes coilovers, at the smallest extent of its diametric range.

FIG. 23 shows an orthographic view of another alternative embodiment of a rear mechanism 750" which includes coilover assemblies 772 rotatably connected on each end to the rotor plate 756 on one end and the main structure 781 on the other end, but otherwise may be the same as rear mechanism 750 described throughout this application and the descriptions of rear mechanism 750 and its uses apply fully to alternative rear mechanism 750". Each coilover assembly 772 shown in this embodiment combines a compression spring and damper into one unit; the dampers of which are of a typical fluid displacement type, sometimes referred to as dashpot dampers, in which actuation of each coilover assembly 772 forces fluid through one or more orifices resulting in a viscous friction that provides a resistance which is proportional to the velocity of actuation, and therefore a damping effect. Coilover assemblies comprising mono-tube type dashpot dampers of various configurations may be used in some embodiments in which an internal piston is able to move longitudinally back and forth through a fluid filled cylinder, thereby forcing the fluid within the cylinder to pass either around the piston or through one or more orifices or valves incorporated into the piston. In the case of a configuration containing a valve or valves, the motion of the piston may be restricted by viscous friction in one direction, but unrestricted or less restricted in the other direction. In the embodiment shown, the internal piston is connected to one end of a guided shaft which may be rotatably connected at its other end to either the rotor plate 756 or the main structure 781; and the fluid filled cylinder which guides the shaft's movement to be longitudinal relative to the cylinder may be rotatably connected to the other of either the rotor plate 756 or main structure 781. In this embodiment, the compression springs which provide the spring force bias to resist the expansion of the rear mechanism's pattern of sprockets are constrained at one end to each coilover cylinder and at the other end to the associated coilover's guided shaft; thereby, enabling compression of the spring as the cylinder and guided shaft slide together. Typically, and in the embodiment shown here, one end of each compression spring is seated against a component surface which is fixed in position relative to its associated coilover's cylinder, and the other end of each compression spring is seated against a surface which is fixed in position relative to its associated coilover's guided shaft. Each spring is positioned such that its longitudinal axis is substantially coaxial to its associated damper's longitudinal axis and is prevented from moving out of place by a feature or features which may be incorporated into the component surface against which the ends of the spring are seated.

The resistance provided by a fluid displacement damper increases as the velocity of actuation increases; thereby, forcing the coilover assemblies 772 and overall rear mechanism 750" to actuate more slowly. This damping effect is especially beneficial in the case of decreasing drive forces and the pattern of sprockets retracting to a smaller diameter. The slowed retraction allows more time for any slack in the chain (not shown) to be taken up by the rest of the system which helps the chain maintain engagement with the sprockets 751 (some not shown for clarity) as they retract inward toward the rear mechanism's axis of rotation and away from the chain's previous path. Any included coilover assemblies 772 may be positioned in an evenly spaced pattern around the rear mechanism's rotational axis such as the four coilover assemblies 772 shown here with an equal 90 degrees between each one; or other combinations such as five coilover assemblies positioned 72 degrees apart from each other, for example, or other numerical combinations than those mentioned as well. In some embodiments, the rear mechanism may comprise a combination of coilover assemblies and regular springs, such as two individual coilover assemblies and two individual compression springs in an alternating pattern, for example.

In FIG. 23, the rear mechanism 750" is shown in a fully contracted state. The rear mechanism 750" is prevented from contracting beyond this point by means of a mechanical high stop 761 which occurs when contact is made between adjacent edge surfaces of each sprocket arm 754. This mechanical high stop 761 limits any further rotation of each sprocket arm 754 about its connection to the main structure 781. In this embodiment, the coilover assemblies 772 are slightly compressed when the rear mechanism 750" is in a fully contracted state to create a preload. A small preload serves to minimize slop and excess vibration by maintaining contact between component surfaces which forces are transferred through; while a slight amount of pre-compression reserves as much actuation range as possible before the springs become fully compressed. While this embodiment utilizes contacting edge surfaces on each sprocket arm 754 to function as the mechanical stops, other suitable features or hardware could be used to prevent one or more parts from moving beyond an allowed range which would effectively stop the rear mechanism 750" from actuating any further. For example, features such as mechanical stops incorporated into each coilover assembly 772 may be used to limit the range of how far each guided shaft may slide into its associated cylinder as well as how much the coilover may extend as the guided shaft slides out of its associated cylinder, effectively limiting the rotation of the rotor plate 756 relative to the main structure 781.

Figure 24:
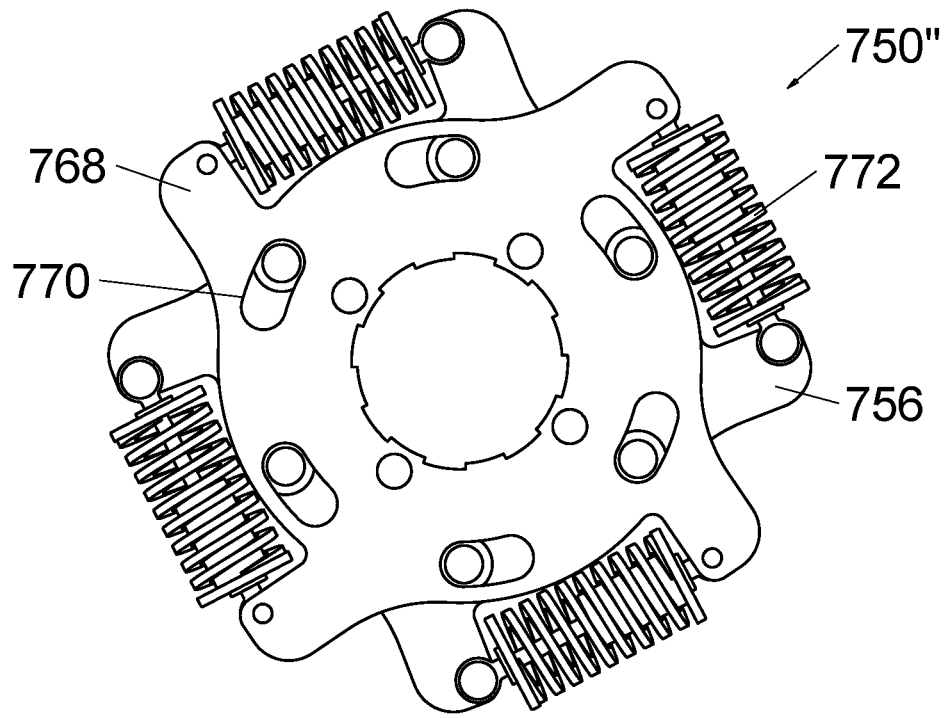
FIG. 24 is an opposing side view of the rear mechanism of FIG. 23.

FIG. 24 shows the opposing side of the rear mechanism 750" of FIG. 23. Each coilover assembly 772 provides a spring force bias and damping to any counter rotation between the sub plate 768 and rotor plate 756 and serves to provide resistance to actuation as well as to slow the contraction of the rear assembly 750" as drive forces decrease. The sub plate 768 includes clearance holes 770 which provide space for the heads of the shoulder screws, which connect the links (not shown) to the rotor plate 756, to move within. This configuration allows the sub plate 768 and rotor plate 756 to be spaced closer together, resulting in a margin between them of, for example, between about 0.1 mm and about 6 mm, or between about 1 mm and about 4 mm, or between about 1.8 mm and 2.8 mm, such as about 2.3 mm or about 2.4 mm or about 2.5 mm, according to various embodiments. This decreased margin between the sub plate 768 and rotor plate 756 helps the spring force bias to load the sub plate 768 and rotor plate 756 in a predominantly rotational direction relative to their axes. Each coilover assembly 772 is positioned such that the spring force bias and damping it provides overlaps the midplane between the sub plate 768 and rotor plate 756. This is achieved by attaching one end of the coilover assembly 772 to the side of the sub plate 768 which is closest to the rotor plate 756 and the other end of the coilover assembly 772 to the side of the rotor plate 756 which is closest to the sub plate 768.

Figure 25:
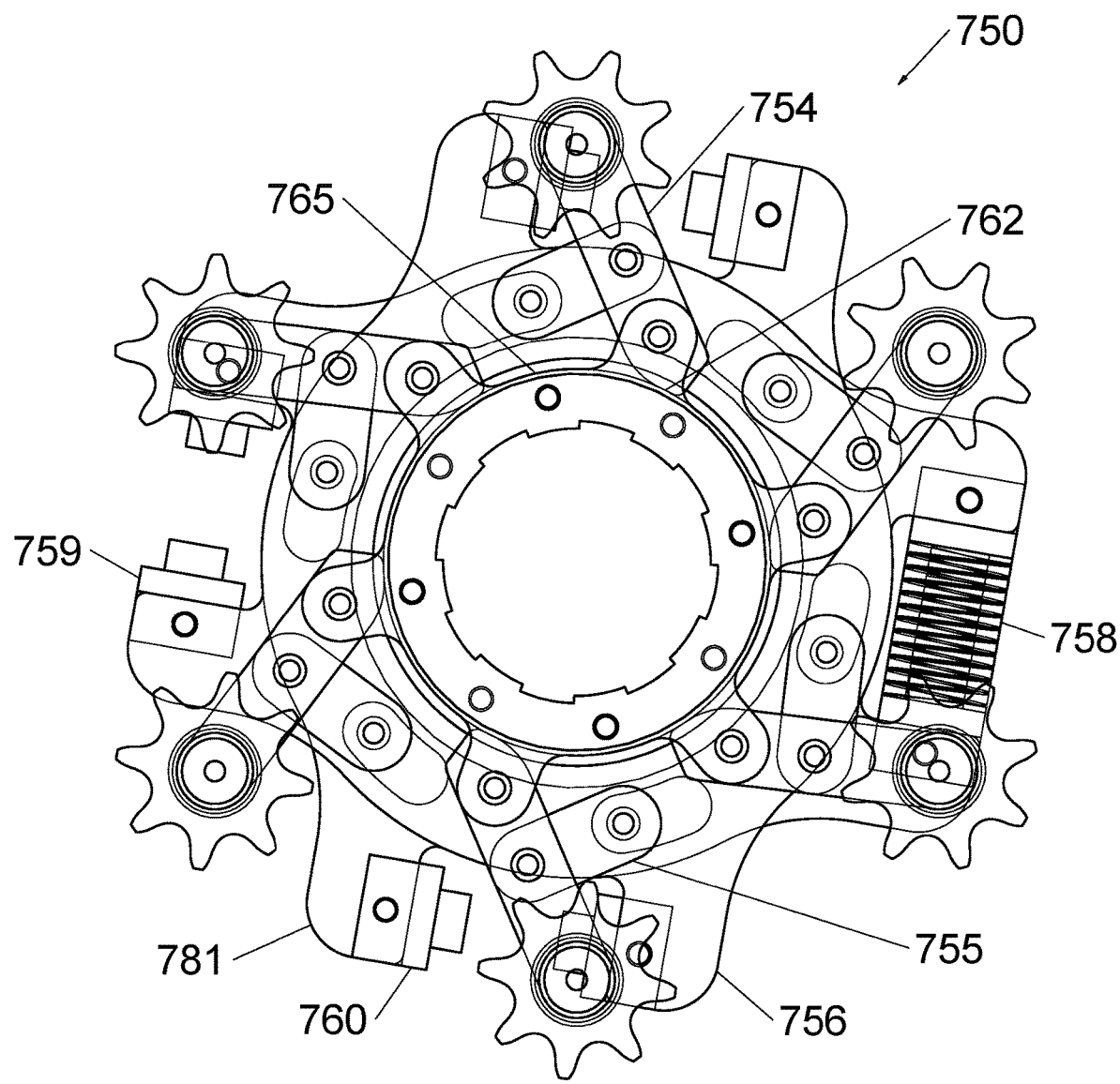
FIG. 25 is a transparent view illustrating an embodiment of a rear mechanism at the largest extent of its diametric range.

FIG. 25 is a transparent view of the rear mechanism 750 in a diametrically expanded state illustrating the profiles of various components with some components not shown for clarity. The rear mechanism 750 is prevented from expanding beyond this point by means of a mechanical low stop 762 which occurs when contact is made between an edge surface of each sprocket arm 754 and an adjacent edge surface of the bearing cap 765. This mechanical low stop 762 limits any further rotation of each sprocket arm 754 about its connection to the main structure 781. In this embodiment, the springs 758 are almost fully compressed when the conditions for the mechanical low stop 762 are met. However, in other embodiments, the springs 758 may be able to fully compress limiting any further diametric expansion of the rear mechanism 750 and negating the need for a mechanical low stop.

To a person skilled in this technological area, it will be apparent that the response of the rear mechanism's expansion relative to the drive forces applied is dependent on the summation of geometric and mechanical variables within the mechanism and therefore could be adjusted to achieve the desired response including both the response curve and the force range desired. A few examples of variables within the rear mechanism 750 that could be adjusted would include the spring force, the radial distance from each sprocket arm's connection with the main plate to the rotational center of the main plate, and the radial distance from each link's connection with the rotor plate to the rotational center of the rotor plate.

Figure 26:
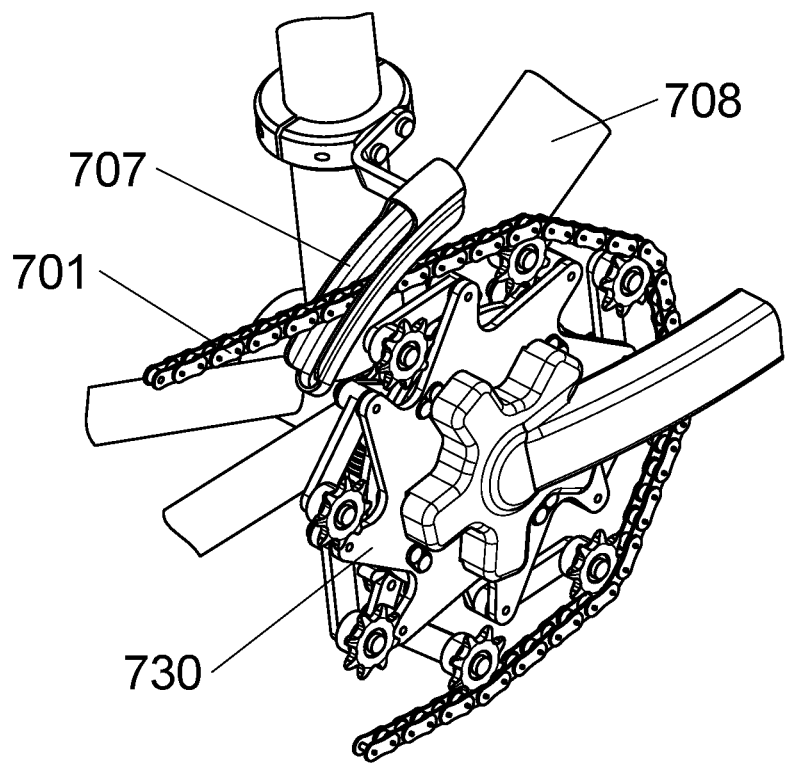
FIG. 26 is an isometric view of a chain guide preceding a front mechanism, according to various embodiments.

The automatic transmission system may include various elements to help guide the roller chain as it progresses along its endless path. FIG. 26 shows a type of chain guide 707 which is mounted to the bicycle frame 708 and may be used in one or more locations to prevent the chain 701 from moving laterally in either direction out of its desired path.

Figure 27:
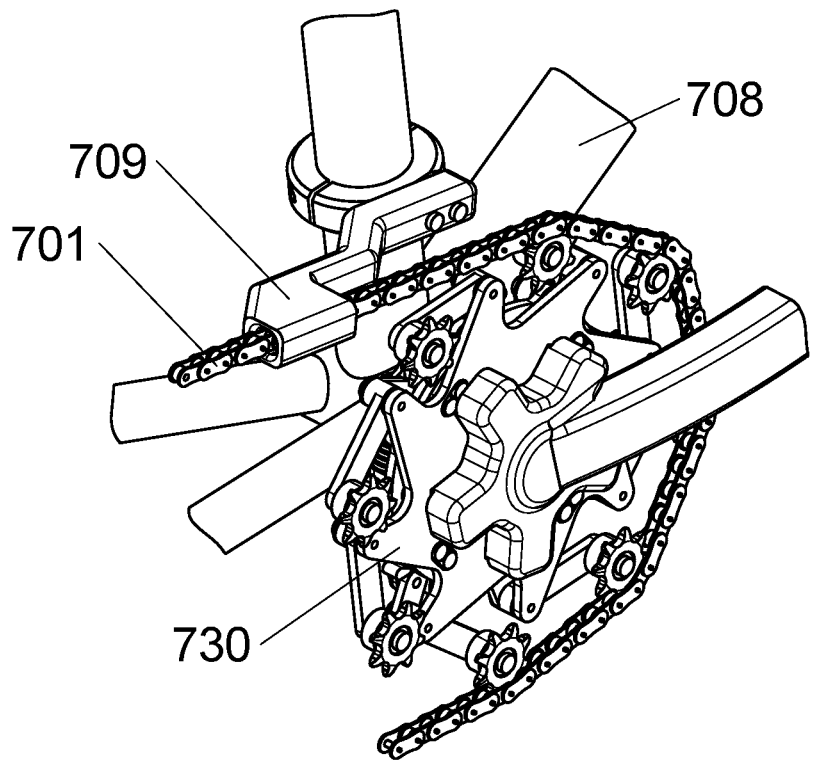
FIG. 27 is an isometric view of an embodiment of an alternative chain guide.

FIG. 27 shows an example of a multi-directional chain guide 709 which also may be used in various locations within the system. A multi-directional chain guide 709 may be used to prevent the roller chain 701 from moving in any direction away from its desired path.

The chain guide or guides used within the system may be of the type intended to stay in contact with the roller chain as it slides across the guide during operation, or of the type which simply prevents the roller chain from moving too far out of its intended path, but is otherwise not in contact with the chain if it is within its allowed envelope.

Figure 28:
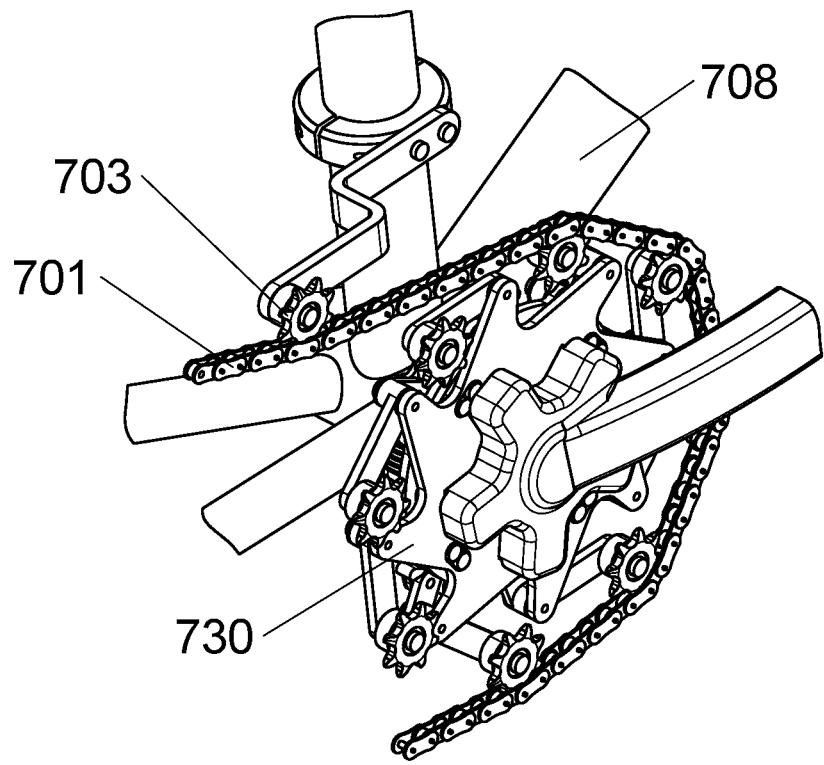
FIG. 28 is an isometric view of an embodiment which includes a drive chain idler preceding a front mechanism.

Some embodiments of the invention, such as the one shown in FIG. 28, may include one or more of chain idler 703 which comprises a free rolling sprocket rotatable on a bearing and centered about a shaft which is held in a fixed position through a connection to the bicycle frame 708. When the sprocket of the chain idler 703 is meshed with the roller chain 701 it restricts the chain from moving both laterally out of its defined path and from moving any further in the direction of the sprocket; the product of which may be used to induce a turn in the chain's path. This method of guiding the chain may be used to re-direct the chain's path, hold the chain closer to or further from adjacent components, restrict the chain from moving laterally away from it defined path, and to reduce vibration in otherwise unsupported spans of chain. The chain idler 703 in the embodiment shown serves several of these purposes including re-directing the chain's path so that it engages with a larger portion of the front mechanism's pattern of sprockets.

Figure 29:
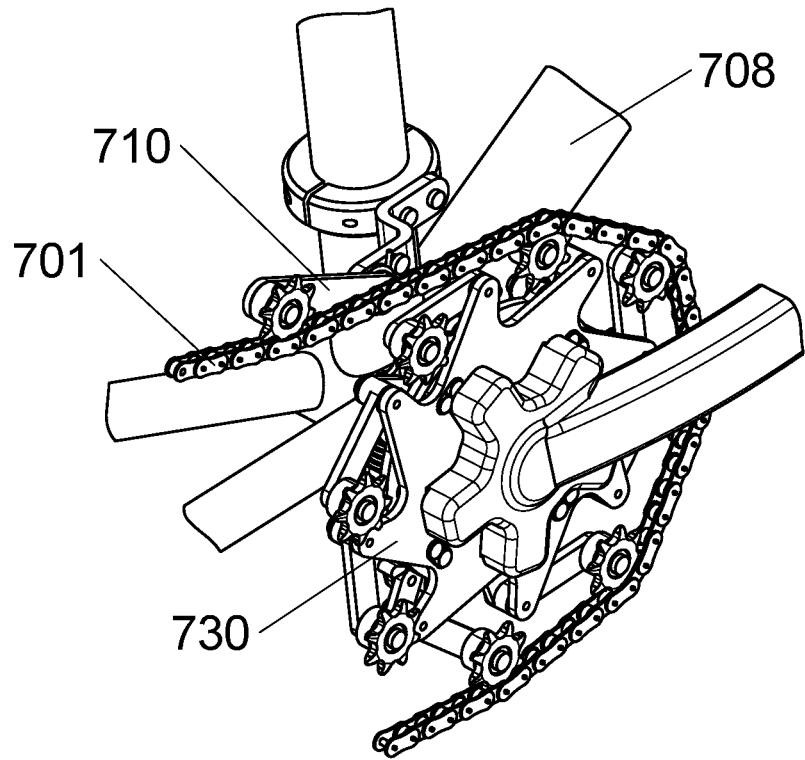
FIG. 29 is an isometric view of an auxiliary chain tensioner preceding a front mechanism, according to various embodiments.

FIG. 29 illustrates an embodiment which includes an auxiliary chain tensioner 710. The auxiliary tensioner 710 comprises a free rolling sprocket rotatable on a bearing and centered about a shaft which is connected to one end of an arm; the arm also being rotatably connected at its other end to a bracket which is mounted to the bicycle frame 708. A torsion spring provides a spring force bias which opposes relative rotation between the rotatable arm and frame mounted bracket and is configured to push the sprocket into the drive chain 701. This configuration applies pressure to the drive chain 701 and may serve as a tensioner and/or guide to control the roller chain. The auxiliary tensioner 710 in the embodiment shown serves several of these purposes including one of minimizing excess vibration in the upper span of chain which may be induced as the chain 701 transitions from sprocket to sprocket on the front mechanism 730 and/or rear mechanism (not shown) during operation.

Figure 30:
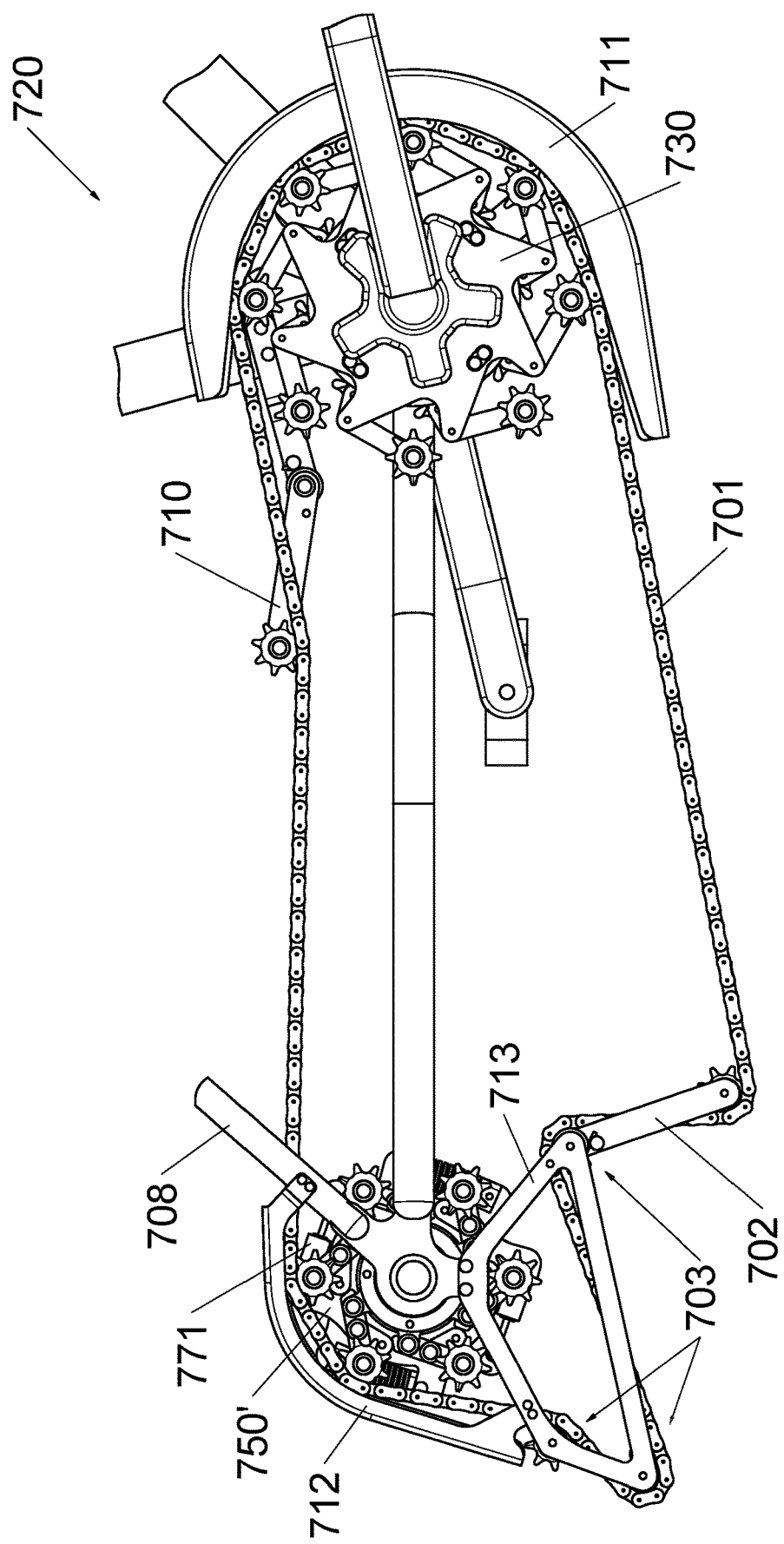
FIG. 30 is a side view of an exemplary embodiment of the automatic transmission system for a bicycle.

FIG. 30 illustrates one possible embodiment of the automatic transmission system 720 with many of the bicycle's components not shown for clarity. The embodiment shown here comprises a front mechanism 730, and a rear mechanism 750', both of which are shown actuated to a point somewhere near the middle of their respective ranges. This embodiment further comprises a roller chain 701 and several chain idlers and tensioners, which help to guide and control the roller chain as it progresses around its endless path. This embodiment includes an auxiliary tensioner 710 preceding the chain's engagement with the front assembly 730, several chain idlers 703 preceding the chain's engagement with the rear assembly 750', and a chain tensioner 702 preceding the chain idlers 703. The chain idlers 703 are rotatably connected to a common frame mounted idler bracket 713. This configuration of chain idlers re-directs the chain's path so that it engages with a smaller portion of the rear mechanism's pattern of sprockets, which in this embodiment is 2 or 3 sprockets at a time depending upon where the pattern of sprockets is at in its rotation about the rear mechanism's axis of rotation. This is beneficial due to the previously described condition wherein the sprocket which is engaged and in closest proximity to where the drive chain 701 enters its engagement with the rear mechanism 750' is forced to lock so that the other engaged sprockets may roll away from that activated sprocket along the chain 701. In order for the length of chain between each engaged sprocket to increase, the extra length must be absorbed from the upper portion of chain which is driven and under tension during operation. A smaller portion of the pattern of sprockets with which the chain 701 is engaged requires a shorter length of extra chain which must be absorbed as the rear mechanism 750' expands. It should be noted that the auxiliary tensioner 710 aids in this process by holding some extra length in the tension side of the chain 701 and allowing that extra length to be absorbed by an expanding rear mechanism 750' as drive forces are increased. Controlling the chain's path to engage with fewer sprockets on the rear mechanism 750' aids in its expansion but also decreases the number of sprocket teeth with which the chain is engaged. As such, the embodiment shown includes dampers 771 within the rear mechanism 750' to slow the speed of its retraction and assist the drive chain 701 in maintaining its engagement with the rear mechanism 750'. It should be noted that damping is not required on the front mechanism 730 because its spring force bias continually pushes the front mechanism's sprockets outward and into the tension of the chain. While the configuration shown in FIG. 30 may provide some advantages, the other configurations described and/or depicted in this disclosure are also appropriate and useful, and still other configurations may also be used with the front and rear mechanisms 730, 750 described herein.

Chain idlers and tensioners may be used to control the path of the chain 701 as it enters and/or exits its engagement with either the front and/or rear mechanism. The entry and exit paths may be partially described with an angle and distance from the center of the applicable front or rear mechanism to the center of its applicable preceding or subsequent sprocket; whereas an angle of 0 degrees is defined as being directly forward relative to the bicycle's direction of travel. For example, in some embodiments, this method may be used to partially describe the chain's path as entering a front mechanism from a preceding sprocket located at an angle of between about 80 degrees and about 200 degrees, or between about 115 degrees and about 180 degrees, or between about 150 and 160 degrees, such as about 154 degrees or about 155 degrees or about 156 degrees; and a distance of between about 80 mm and about 500 mm, or between about 110 mm and about 390 mm, or between about 140 mm and 200 mm, such as about 159 mm or about 160 mm or about 161 mm; the exact angle and distance depending upon the instantaneous position of the applicable sprocket with respect to any actuation of the automatic transmission system. Similarly, the chain's path may be partially described as exiting the front mechanism to a subsequent sprocket located at an angle and distance relative to the front mechanism. In another example, this method may be used to partially describe the chain's path as entering a rear mechanism from a preceding sprocket located at an angle of between about 130 degrees and about 360 degrees, or between about 160 degrees and about 300 degrees, or between about 190 and 240 degrees, such as about 219 degrees or about 220 degrees or about 221 degrees; and a distance of between about 50 mm and about 500 mm, or between about 65 mm and about 300 mm, or between about 80 mm and 100 mm, such as about 93 mm or about 94 mm or about 95 mm; the exact angle and distance depending upon the instantaneous position of the applicable sprocket with respect to any actuation of the automatic transmission system. Similarly, the chain's path may be partially described as exiting the rear mechanism to a subsequent sprocket located at an angle and distance relative to the rear mechanism. Other factors that have an effect on the chain's instantaneous path include the amount of actuation of both the front and rear mechanism and where each of their patterns of sprockets are at in their rotations about their respective axes. A multitude of different chain paths are envisioned which may enable functionality, and the embodiment shown in FIG. 30 is merely an example of a chain path that has been found to provide a satisfactory balance of sufficient engagement while allowing the system to actuate properly.

The automatic transmission system 720 may also include accessories such as the front guard 711, and rear guard 712 shown here. These guards are connected to the bicycle frame and provide a barrier around a portion or portions of the system which serves to protect both the system's components from external objects as well as the rider from coming into contact with moving parts during operation.

A variety of materials may be chosen for the system's components to be made from. While many aluminum, steel, and stainless steel alloys such as 304 SST offer favorable properties in regards to the strength and rigidity required, other suitable materials such as rigid plastics, composites, and other metal alloys could also be used so long as the chosen material provides effective properties for that components function. A variety of other materials may also be used beneficially within the system and could include formulations of lubricants, adhesives, and surface coatings like paint or anodizing, for example.

The fasteners and mechanical hardware within the embodiments shown are examples only and, throughout the system, a variety of alternative methods could be employed while still facilitating proper functionality of the various embodiments of the invention. For example, alternative spring types could include a variety of compression springs, tension springs, torsion springs, or leaf springs. According to various embodiments, the compression springs within the front mechanism 730 and rear mechanism 750 are readily removeable and therefore may be replaced with a relatively minor amount of effort. It follows that by replacing the existing compression springs with variations that have different properties may be the most efficient way to alter the response within the system to suit different riders. For a rider who prefers a softer response which allows the system to be fully actuated with relatively less drive force being applied, springs within the front and rear mechanisms with a relatively lower spring rate and/or maximum load may be ideal. For a rider who prefers a stiffer response which requires a relatively larger amount of drive force being applied for the system to become fully actuated, springs within the front and rear mechanisms with a relatively higher spring rate and/or maximum load may be ideal. A manufacturer of the system may even make available replacement sets of springs that geometrically fit well within the system but have varying properties between each set such as low, medium, and high force sets, for example.

While the embodiments shown utilize shoulder screws to facilitate rotatable connections between many components within the assemblies, other methods such as dowel pins and retaining rings could similarly be used. In the case of threaded fasteners, the selection of right-hand or left-hand threading may be made in consideration of any applied torque on that particular fastener. Threaded fasteners may even be secured with a nut in instances where space and functionality allow it. A variety of bearings may also be utilized within the rotational connections throughout the system to decrease friction and aid in the rotational movement between components. Some common examples of bearing types that could be used within the system's sub-assemblies may include sleeve bearings, journal bearings, one-way locking roller bearings, and non-locking roller bearings; the roller bearings of which may be of the needle or ball bearing type. Additionally, while the embodiments shown herein utilize washers or spacers positioned between adjacent components at each rotatable connection to create margins while limiting non-rotational movement, shoulders incorporated directly into some components could be employed to achieve the same result, for example. Any of these means, methods, or combinations thereof could be utilized within the assemblies and sub-assemblies throughout the system to facilitate proper functionality and are considered within the spirit and scope of this invention.

The term "substantially" and other similar terms may be interpreted to mean within readily recognized tolerances dependent on manufacturing methods, material consistency, assembly accuracy, and other minor deviations.

While the example embodiments have been described with relation to a bicycle, it will be appreciated that the above concepts can also be used in various non-bicycle apparatuses. For example, such mechanisms can be used in conjunction with 3 or 4 wheeled vehicles being manually powered or machine powered. Accordingly, the disclosure should not be limited strictly to bicycles, etc.

In the foregoing description, the inventions have been described with reference to specific embodiments. However, it may be understood that various modifications and changes may be made without departing from the scope of the inventions. The disclosure is not intended to limit the inventions to the embodiments disclosed and many modifications and variations are possible in view to the above teachings. For example, various embodiments may be combined, and reference to one embodiment or some embodiments does not preclude one or more methods, functions, steps, features, results, or hardware implementations of different embodiments from being combined.

What is claimed is:

1. An automatic transmission mechanism for a bicycle comprising:
   a rotor plate comprising opposing first and second surfaces and a central axis;
   a main structure comprising at least one plate comprising opposing first and second surfaces and a central axis, wherein the rotor plate and the main structure are coaxial and configured to counter-rotate relative to each other;
   a plurality of linkages in a substantially evenly spaced radial pattern, each of the linkages comprising:
      an arm rotatably connected to the main structure at a proximal end; and
      a link having a first end and a second end, wherein the first end is rotatably connected to the rotor plate and the second end is rotatably connected to the arm;
   a plurality of compression springs, wherein each compression spring comprises a coil having a first end and a second end, wherein the first end of each coil is connected to the first surface of the rotor plate at one of a plurality of connection points and the second end of each coil is connected to the first surface of the main structure at one of a plurality of connection points, wherein each coil compresses in length as force is applied in a substantially axial direction normal to each end of the spring;
   wherein each of the plurality of connection points of the rotor plate is further oriented such that compression of the springs imparts a torque on the rotor plate about its central axis;
   wherein each of the plurality of connection points of the main structure is further oriented such that compression of the springs imparts a torque on the main structure about its central axis;
   wherein the automatic transmission mechanism is configured to transfer drive force, wherein increasing drive force causes the rotor plate to counter-rotate relative to the main structure in a direction moving the plurality of connection points of the rotor plate and the plurality of connection points of the main structure closer together thereby compressing the plurality of compression springs; and
   wherein the plurality of compression springs provide an increasing resistance force to counter-rotation of the rotor plate relative to the main structure by compressing further as drive forces increase, and wherein decreasing drive force allows the plurality of compression springs to decompress and counter-rotate the rotor plate in an opposite direction relative to the main structure.

2. The automatic transmission mechanism of claim 1 further comprising a plurality of sprockets in a radial pattern configured to engage with a drive chain, wherein each of the plurality of sprockets is restricted from rotating in a direction which enables a transfer of drive forces in propelling a bicycle forward but is able to rotate in the other direction, wherein each of the plurality of sprockets is attached to a distal end of the arm of one of the plurality of linkages, and wherein the automatic transmission mechanism is configured to automatically adjust a torque ratio in response to changing drive forces by one of either diametric expansion or diametric contraction of the pattern of sprockets.

3. The automatic transmission mechanism of claim 2 wherein the automatic transmission mechanism is a front mechanism configured to transfer the drive forces between a crank assembly and the drive chain, wherein the spring force biases the pattern of sprockets toward diametric expansion and wherein the pattern of sprockets is configured to diametrically compress as the drive forces are increased.

4. The automatic transmission mechanism of claim 2 wherein the automatic transmission mechanism is a rear mechanism configured to transfer the drive forces between the drive chain and a rear wheel hub, wherein the spring force biases the pattern of sprockets toward diametric contraction and wherein the pattern of sprockets is configured to diametrically expand as the drive forces are increased.

5. The automatic transmission mechanism of claim 4 wherein the rear mechanism further comprises one or more fluid displacement dampers configured to slow a decreasing of a diameter of the pattern of sprockets when the drive forces are reduced.

6. The automatic transmission mechanism of claim 4 wherein the automatic transmission mechanism further comprises an auxiliary drive chain tensioner configured to apply pressure to an upper span of the drive chain, wherein the applied pressure increases a path length of the upper span of the drive chain as drive forces decrease, and wherein the path length decreases as increasing drive forces overcome the pressure applied by the auxiliary drive chain tensioner.

7. The automatic transmission mechanism of claim 1 further comprising a plurality of pulleys in a radial pattern configured to engage with a drive belt, wherein each of the plurality of pulleys is restricted from rotating in a direction which enables a transfer of drive forces in propelling a bicycle forward but is able to rotate in the other direction, wherein each of the plurality of pulleys is attached to a distal end of the arm of one of the plurality of linkages, and wherein the automatic transmission mechanism is configured to automatically adjust a torque ratio in response to changing drive forces by one of either diametric expansion or diametric contraction of the pattern of pulleys.

8. The automatic transmission mechanism of claim 7 wherein the automatic transmission mechanism is a front mechanism configured to transfer the drive forces between a crank assembly and the drive belt, wherein the spring force biases the pattern of pulleys toward diametric expansion and wherein the pattern of pulleys is configured to diametrically compress as the drive forces are increased.

9. The automatic transmission mechanism of claim 7 wherein the automatic transmission mechanism is a rear mechanism configured to transfer the drive forces between the drive belt and a rear wheel hub, wherein the spring force biases the pattern of pulleys toward diametric contraction and wherein the pattern of pulleys is configured to diametrically expand as the drive forces are increased.

10. The automatic transmission mechanism of claim 9 wherein the rear mechanism further comprises one or more fluid displacement dampers configured to slow a decreasing of a diameter of the pattern of pulleys when the drive forces are reduced.

11. The automatic transmission mechanism of claim 9 wherein the automatic transmission mechanism further comprises an auxiliary drive belt tensioner configured to apply pressure to an upper span of the drive belt, wherein the applied pressure increases a path length of the upper span of the drive belt as drive forces decrease, and wherein the path length decreases as increasing drive forces overcome the pressure applied by the auxiliary drive belt tensioner.

12. The automatic transmission mechanism of claim 1 wherein the main structure is configured to receive input force from a shaft driven by manual or motorized power.

13. The automatic transmission mechanism of claim 1 further comprising a plurality of stops to limit each arm from rotating beyond an allowed range of rotation relative to the main structure.

14. An automatic transmission system for a bicycle comprising:
a drive chain;
a rear wheel hub; and
a rear mechanism configured to transfer drive forces between the drive chain and the rear wheel hub, the rear mechanism comprising:
a plurality of sprockets in a substantially evenly spaced radial pattern proximal to a common plane and substantially equidistant from the pattern's centroid, each of the plurality of sprockets comprising a rotational center, wherein the plurality of sprockets are configured to engage with the drive chain, wherein the drive chain partially encompasses a periphery of the pattern of sprockets, wherein the pattern of sprockets is configured to expand and contract about its centroid in unison, and wherein each of the plurality of sprockets is restricted from rotating in a direction which enables a transfer of drive forces in propelling the bicycle forward but is able to rotate in an opposite direction;
one or more springs providing a spring force bias which biases the pattern of sprockets toward diametric contraction;
a first plate having a central axis;
a second plate, rotatable relative to the first plate about a common axis;
a plurality of linkages arranged in a radial pattern about the first plate's central axis, each linkage comprising:
an arm connected to the first plate at a first pivotable linkage connection,
a link connected to the arm at a second pivotable linkage connection, the link also connected to the second plate at a third pivotable linkage connection, and
a fourth pivotable linkage connection between the first plate and the second plate, wherein the fourth pivotable linkage connection is a common connection within each of the plurality of linkages,
wherein the plurality of linkages actuate in unison as the first plate and second plate counter-rotate relative to each other, wherein each of the plurality of sprockets is connected to one of the plurality of linkages, wherein a radial distance from the first plate's central axis to the rotational center of each sprocket corresponds to an amount of actuation of each of the plurality of linkages, wherein each of the plurality of linkages actuates in an outward direction expanding the radial pattern of sprockets toward the drive chain as drive forces increase, and wherein each of the plurality of linkages actuates in an inward direction contracting the radial pattern of sprockets away from the drive chain as drive forces decrease; and
one or more dampers configured to slow inward actuation of each of the plurality of linkages as drive forces decrease,
wherein the rear mechanism is configured to automatically adjust a torque ratio in response to changing drive forces by one of either diametric expansion of the pattern of sprockets as drive forces increase or diametric contraction of the pattern of sprockets as drive forces decrease.

15. The automatic transmission system of claim 14 wherein the first plate is configured to receive input force from the rear wheel hub and the drive chain.

16. The automatic transmission system of claim 14 wherein the one or more springs bias the first plate and second plate against counter-rotation relative to each other.

17. The automatic transmission system of claim 14 wherein each arm is further attached to one of the plurality of sprockets at a distal end of the arm.

18. The automatic transmission system of claim 17 further comprising a plurality of stops to limit each arm from rotating outward beyond a largest allowed rotation.

19. The automatic transmission system of claim 14 wherein the one or more springs comprise compression springs.

20. The automatic transmission system of claim 14 wherein the one or more dampers comprise fluid displacement dampers.

* * * * *